(12) United States Patent
Rosen et al.

(10) Patent No.: US 9,813,936 B2
(45) Date of Patent: Nov. 7, 2017

(54) SYSTEM AND METHOD FOR SCHEDULING TIME-SHIFTING TRAFFIC IN A MOBILE CELLULAR NETWORK

(71) Applicants: AT&T Intellectual Property I, LP, Atlanta, GA (US); The Regents of the University of Michigan, Ann Arbor, MI (US)

(72) Inventors: Sanae Leah Madeleine Rosen, Ann Arbor, MI (US); Jeffrey Erman, Morristown, NJ (US); Vijay Gopalakrishnan, Edison, NJ (US); Zhuoqing Morley Mao, Ann Arbor, MI (US); Jeffrey Pang, Berkeley, CA (US)

(73) Assignees: AT&T INTELLECTUAL PROPERTY I, L.P., Atlanta, GA (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 176 days.

(21) Appl. No.: 14/693,571

(22) Filed: Apr. 22, 2015

(65) Prior Publication Data

US 2016/0316388 A1    Oct. 27, 2016

(51) Int. Cl.
*H04W 28/02* (2009.01)
*H04W 72/12* (2009.01)
*H04W 24/08* (2009.01)

(52) U.S. Cl.
CPC ....... *H04W 28/0231* (2013.01); *H04W 72/12* (2013.01); *H04W 24/08* (2013.01)

(58) Field of Classification Search
CPC . H04W 28/0231; H04W 72/12; H04W 24/08; H04L 47/14
See application file for complete search history.

(56) References Cited

U.S. PATENT DOCUMENTS 6,366,780 B1    4/2002   Obhan et al.
7,298,327 B2   11/2007   Karr et al.
(Continued)

FOREIGN PATENT DOCUMENTS

AU    2009243224 A1    11/2009
EP       1617579 A3     4/2006
(Continued)

OTHER PUBLICATIONS

Chappuis, Bertil et al., "Are your customers becoming digital junkies", McKinsey Quartely, http://www.looooker.com/wpcontent/uploads/2013/05/Areyourcustomersbecomingdigitaljunkies.pdf, 2011.
(Continued)

*Primary Examiner* — Paul H Masur
(74) *Attorney, Agent, or Firm* — Guntin & Gust, PLC; Joseph Hrutka

(57) ABSTRACT

Aspects of the subject disclosure may include, for example, identifying a data request to transfer data for a mobile device across a mobile network. The data request occurs within a time interval of a number of time intervals, each having a duration greater than a data transfer time across the mobile network. A volume is determined of the data requested, and compared to a data transfer capacity of the wireless access terminal. A transfer of the data is scheduled within the time interval, responsive to the volume of data requested being less than the data transfer capacity. The transfer of the data is deferred to another time interval, responsive to the volume of data requested being greater than the data transfer capacity, and the deferring of the data to another time includes resubmitting the data request in another time interval of the plurality of time intervals. Other embodiments are disclosed.

20 Claims, 24 Drawing Sheets

(56) References Cited

U.S. PATENT DOCUMENTS

| | | |
|---|---|---|
| 7,634,652 B2 | 12/2009 | McEnroe et al. |
| 7,876,996 B1 | 1/2011 | Herz |
| 8,023,948 B2 | 9/2011 | Han et al. |
| 8,213,978 B1 | 7/2012 | Ho et al. |
| 8,351,466 B2 | 1/2013 | Fisher |
| 8,352,988 B2 | 1/2013 | Cleary et al. |
| 8,542,976 B2 | 9/2013 | Stevens |
| 8,660,409 B2 | 2/2014 | DeLuca et al. |
| 8,712,217 B1 | 4/2014 | Holden et al. |
| 8,769,569 B1 | 7/2014 | Slavenburg et al. |
| 8,788,933 B2 | 7/2014 | Hannuksela et al. |
| 8,904,026 B2 | 12/2014 | Weigand et al. |
| 2003/0074670 A1 | 4/2003 | Penk et al. |
| 2003/0099202 A1 | 5/2003 | Lear et al. |
| 2003/0188320 A1 | 10/2003 | Shing |
| 2004/0214577 A1 | 10/2004 | Borst et al. |
| 2007/0081789 A1 | 4/2007 | Winick et al. |
| 2007/0234390 A1 | 10/2007 | Bankers et al. |
| 2008/0109857 A1 | 5/2008 | Goodwill et al. |
| 2010/0034256 A1 | 2/2010 | Bennett |
| 2010/0296797 A1 | 11/2010 | Thijssen |
| 2012/0052883 A1 | 3/2012 | Austin et al. |
| 2012/0064908 A1 | 3/2012 | Fox et al. |
| 2013/0051239 A1 | 2/2013 | Meredith et al. |
| 2013/0136102 A1 | 5/2013 | Macwan et al. |
| 2014/0059121 A1 | 2/2014 | Wang |
| 2014/0179332 A1 | 6/2014 | Qian et al. |
| 2014/0247813 A1* | 9/2014 | Henneberg Rysgaard ................ H04W 72/12 370/336 |
| 2014/0297745 A1 | 10/2014 | Tarbox et al. |
| 2014/0341039 A1 | 11/2014 | Rubin et al. |
| 2015/0012619 A1 | 1/2015 | Fiul |
| 2015/0341838 A1 | 11/2015 | Pinheiro et al. |
| 2015/0381598 A1* | 12/2015 | Koved ................ H04L 63/08 726/3 |
| 2016/0080237 A1* | 3/2016 | Halepovic ........... H04L 43/0894 709/224 |
| 2016/0128083 A1* | 5/2016 | Shakya ................ G06F 9/5072 455/406 |
| 2016/0164784 A1* | 6/2016 | Amemiya ............... H04L 47/29 709/235 |
| 2016/0316390 A1 | 10/2016 | Gopalakrishnan |

FOREIGN PATENT DOCUMENTS

| | | |
|---|---|---|
| EP | 2476250 A2 | 7/2012 |
| EP | 2749058 A1 | 7/2014 |

OTHER PUBLICATIONS

Dyaberi, Jagadeesh, "Managing cellular congestion using incentives", Communications Magazine, IEEE 50.11, http://www.research.att.com/techdocs/TD_100423.pdf, 2012, 100-107.

Esteve, M. et al., "A video streaming application for urban traffic management", Universidad Politecnica de Valencia, Spain, http://www.researchgate.net/profile/Benjamin_Molina/publication/223554572_A_video_streaming_application_for_urban_traffic_management/links/02e7e52b163067c498000000.pdf, Jun. 1, 2006.

Guo, Meng et al., "Scalable live video streaming to cooperative clients using time shifting and video patching", INFOCOM, Twentythird AnnualJoint Conference of the IEEE Computer and Communications Societies. vol. 3. IEEE, 2004, p. 5.

Kurozumi, Takayuki et al., "A robust audio searching method for cellularphonebased music information retrieval", Pattern Recognition, 2002. Proceedings. 16th International Conference on. vol. 3. IEEE, http://hci.iwr.uniheidelberg.de/publications/dip/2002/ICPR2002/DATA/11_4_13.PDF, 2002.

Sen, Soumya et al., "Incentivizing timeshifting of data: a survey of timedependent pricing for internet access", Communications Magazine, IEEE 50.11, http://www.tc.umn.edu/~ssen/papers/IEEEComMagpreprint.pdf, 2012, 91-99.

* cited by examiner

Heavy Congestion
 Moderate Congestion
 Light Congestion

1st Data Transfer
 2nd Data Transfer

300

600A

1600

1700

1800

1900

2200

2700

SYSTEM AND METHOD FOR SCHEDULING TIME-SHIFTING TRAFFIC IN A MOBILE CELLULAR NETWORK

FIELD OF THE DISCLOSURE

The subject disclosure relates to a system and method for scheduling time-shifting traffic in a mobile cellular network.

BACKGROUND

With increasingly widespread deployment of advanced mobile cellular networks, such as Long Term Evolution (LTE), these networks are replacing wired networks as the main access networks of choice. Cellular networks continue to adapt to accommodate increased data traffic in view of radio spectrum, which remains a scare resource and will only continue do so for some time to come. Video consumption, in particular, has grown to account for almost 50% of network traffic in cellular networks. Consequently, techniques that enable efficient use of the cellular spectrum and delivery of videos are invaluable to any cellular service provider.

BRIEF DESCRIPTION OF THE DRAWINGS

Reference will now be made to the accompanying drawings, which are not necessarily drawn to scale, and wherein.

DETAILED DESCRIPTION

Figure 1:
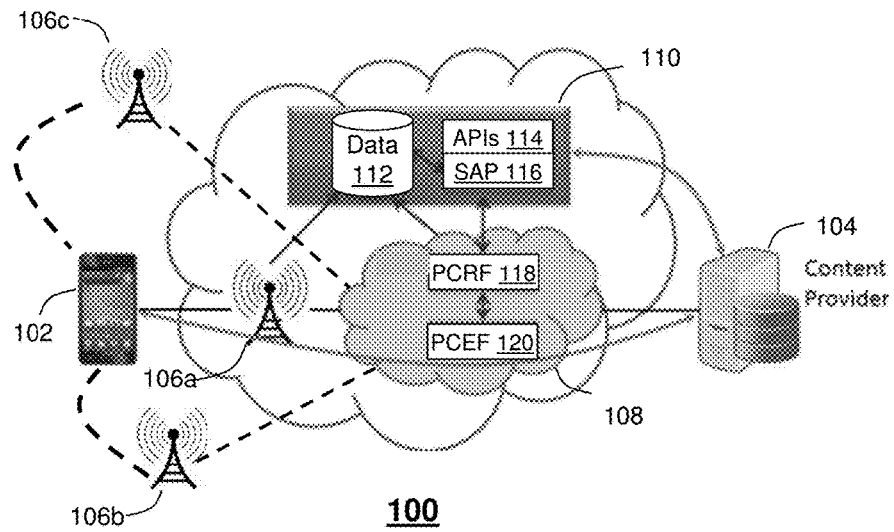
FIG. 1 depicts an illustrative embodiment of a system that time shifts data transfers of mobile devices.

The subject disclosure describes, among other things, illustrative embodiments for a system, a process and software that time-shifts transfer of data over a mobile cellular network. Time-shifting can be applied selectively to data that users and/or applications designate as delay-tolerant, for example, by leveraging variations in network load over time and between base stations to shift network traffic away from busy times and/or locations. Other embodiments are described in the subject disclosure.

One or more aspects of the subject disclosure include a scheduler that monitors base station utilization within a mobile cellular network. The scheduler can respond to requests for transfer of delay-tolerant data or content based on utilization of base stations servicing mobile devices participating in the transfers. If utilization is high, indicating possible congestion of wireless channels, transfer of the delay-tolerant content can be scheduled to another time. Depending upon mobility of the mobile device, any scheduling of the content can result in transfer occurring through other cells of the mobile cellular network.

For example, an application of a smart phone submits a request to a content provider to download a video content item. The scheduler determines that the base station serving the smart phone is heavily congested, and based on the request, that the video content item may be delay tolerant. The scheduler can identify one or more options for delivering the video content item that can include time-shifting the request to another time and/or transporting the video content item at a different data rate. The smart phone can indicate a selection of one of the options, notifying the scheduler of the same. The smart phone can resubmit the request at the scheduled time. The scheduler and/or the network service provider can ensure that the video content item is delivered by any deadline that might apply.

One embodiment of the subject disclosure includes a system including a processor and a memory that stores executable instructions that, when executed by the processor, facilitate performance of operations. The operations include identifying an original data transfer request requesting a transfer of data to a mobile device via a mobile network, wherein the original data request occurs during a scheduling interval of a number of scheduling intervals. Each scheduling interval of the number of scheduling intervals has a duration greater than a data transit time of the mobile network. A quantity of data requested by the original data transfer request and a scheduling capacity of a candidate base station are identified. The quantity of data requested is compared to the scheduling capacity, and the candidate base station is directed to deliver data to the mobile device during the scheduling interval, responsive to the quantity of data requested being less than the scheduling capacity. The original data transfer request is deferred to a subsequent scheduling interval of the number of scheduling intervals, responsive to the quantity of data requested being greater than the scheduling capacity and the deferring of the original data transfer request to the subsequent scheduling interval of the plurality of scheduling intervals includes resubmitting the original data transfer request in the subsequent scheduling interval of the plurality of scheduling intervals Another embodiment of the subject disclosure includes a process that includes identifying a download request to download data to a mobile device via a mobile network during a scheduling interval. Each scheduling interval of a number of scheduling intervals has a duration greater than a data transfer time across the mobile network. An amount of data requested by the download request is identified and compared to a data transfer capacity of a base station. The download request is scheduled within the scheduling interval, responsive to the amount of data requested being less than the data transfer capacity. The download request is deferred to another scheduling interval of the number of scheduling intervals, responsive to the amount of data requested being greater than the data transfer capacity, and the deferring of the download request to the another scheduling interval of the plurality of scheduling intervals includes resubmitting the download request in the another scheduling interval of the plurality of scheduling intervals.

Yet another embodiment of the subject disclosure includes a machine-readable storage medium, including executable instructions that, when executed by a processor, facilitate performance of operations. The operations include identifying a data request to transfer data for a mobile device across a mobile network. The data request occurs within a time interval of a number of time intervals, each having a duration greater than a data transit time across the mobile network. A volume of data requested by the data request is determined and compared to a data transfer capacity of the wireless access terminal. A transfer of the data is scheduled within the time interval, responsive to the volume of data requested being less than the data transfer capacity. Transfer of the data is deferred to another time interval of the number of time intervals, responsive to the volume of data requested being greater than the data transfer capacity, and the deferring of the data to the another time includes resubmitting the data request in the another time interval of the plurality of time intervals.

FIG. 1 depicts an illustrative embodiment of a system 100 that time shifts data downloads to and/or from mobile devices. The system 100 includes a mobile cellular network having a core network portion 108 in communication with one or more wireless base stations 106a, 106b, 106c, generally 106. The base stations 106 provide a physical link to mobile devices 102 using a radio access network. The radio access network provides one or more wireless channels to support communications between the mobile devices, or user equipment 102, and other network destinations through the core network 108. One such destination is equipment of a content service provider, e.g., a content server 104, that provide access to data content items. The data content items can include, without limitation, multimedia content items, such as audio and/or video. Other data content items can include data files, applications, gaming content, advertising content, and the like.

It should be understood that downloading, or transfer, of the data content item can occur in response to a request. The request can include indicia of the data content item to be downloaded, as well as a download destination, and in at least some instances, other download parameters, such as a deadline and/or other constraints, such as data rate capabilities, available storage, and the like. The downloading can occur as a single download, e.g., in an uninterrupted manner, or the downloading can occur in multiple downloads, e.g., each download accommodating a segment or portion of the requested data content item. Beneficially, multiple segments can be scheduled and processed automatically. Alternatively or in addition, each of the multiple segments can be transferred in response to a respective separate request. Namely, a request for a data content item can result in multiple requests for respective segments of the same data content item.

The system 100 also includes a scheduler, e.g., a scheduling server 110, in communication with the base stations 106, the mobility core network 108 and a content server 104. The scheduling server 110 can facilitate time-shifting of transfers of data content items to reduce congestion of network elements, such as the base stations 106, including the wireless channels of the radio access network. In some embodiments, the scheduling server 110 includes a service analysis platform 116 in communication with a data storage device or service 112. The scheduling server 110 can also include APIs 114 that can be made available to the user equipment, 102, the content provider 104 and/or other devices and systems to promote interoperability with the scheduling server 110 and access to time-shifting services provided by the scheduling server 110.

In operation, the user equipment 102 can contact the content server by way of the mobility core network 108 to place a request for a transfer of a data content item. The content server 104, in response to the request, can transfer the requested data content item by way of the mobility core network 108. The transfer can be a bulk data transfer of one or more data content items, such as a download of an MP3 audio file or an MPEG multimedia file.

The scheduling server 110 can determine whether the base station 106a in communication with the user equipment 102 has sufficient available capacity to accommodate downloading of the data content item at the time of the request. To the extent that such available capacity is not available, the scheduling server 110 can identify one or more opportunities, or options for transferring the data at another time(s) and/or in another manner, for example, at a lower transfer rate. The scheduling server 110 can provide such options to the user equipment 102. In response to selection of an option, the user equipment 102, in turn, delays and/or otherwise alters the transfer request according to the selected option. The content server 104 can transfer the data content item to the user equipment 102 based on the selected option.

In some embodiments, the scheduling server 110 communicates with one or more of a Policy and Charging Rules Function (PCRF) 118 or the Policy and Charging Enforcement Function PCEF 120 regarding the requested download, e.g., according to the selected option. The PCRF 118 can be implemented as a software node designated in real-time to determine policy rules in a multimedia network. As shown, the PCRF 118 operates at the network core 108 so that it can access subscriber databases and other specialized functions, such as a charging system, in a centralized manner and in real time. The PCEF 120 is in communication with the PCRF 118, e.g., over a Gx interface. The PCEF 120 enforces policy decisions that are received from the PCRF 118 and provides the PCRF 118 with subscriber and access information over the Gx interface. The PCRF 118 and/or the PCEF 120 can be configured to ensure that the requested data content item is downloaded by a particular deadline. Such assurances can be met by one or more of changing a priority indicator of one or more data transfers including the requested transfer, re-scheduling of data traffic, including the requested data transfer, offloading mobile users to other time slots, and/or other channels or frequencies, and/or other base stations 106. The scheduler can give the PCRF/PCEF a schedule of transfers for each of the mobile device. For example, allow traffic to device A at time t, don't allow traffic to device B at time t, etc. Based on the schedule, the PCRF/PCEF can allow or prevent flows and thereby ensure that the data is downloaded by the particular deadline. There may be occasions when the utilization forecast is not accurate. In such conditions, actions like changing priority are added features that PCRF/PCEF can take to ensure that content is delivered.

Figure 2:
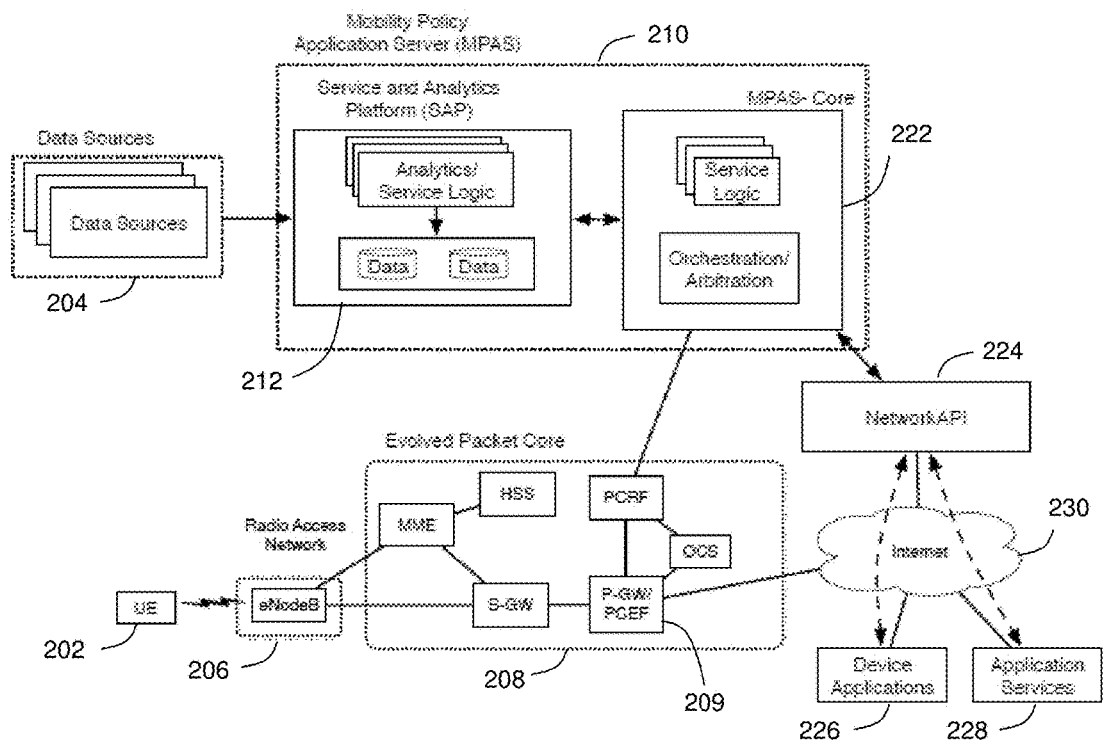
FIG. 2 depicts, in more detail, an illustrative embodiment of a system that time shifts data transfers of mobile devices, such as any of the system described in FIG. 1.

FIG. 2 depicts, in more detail, an illustrative embodiment of a system 200 that time shifts bulk data downloads to mobile devices. The illustrative example includes a Long Term Evolution (LTE) network having an Evolved Packet Core (EPC) 208. It should be understood, however, that the techniques disclosed herein can be applied to any mobile cellular network, including those disclosed hereinbelow. The EPC 208 is in wireless communication with a mobile device 202 through a base station 206, e.g., an Evolved Node B (eNodeB) 206. The EPC 208 includes various internal structures, such as a Packet Gateway (P-GW) 209 according to LTE network architectures. The P-GW 209 is in further communication with other networks, including a wide area network, such as the Internet 230.

The system 200 also includes a mobility policy application server (MPAS) 210. The MPAS 210 includes a Service and Analytics Platform (SAP) 212 in communication with an MPAS core 222. The SAP 212 can include analytics and/or service logic that access stored records, such as records of utilization per eNodeB 206, for one or more eNodeBs 202 of a region being served by the MPAS 210. It is envisioned that the MPAS 210 can be provisioned as a single entity for an entire mobile cellular network, or more likely as multiple entities, each entity serving a respective region of the network. Each region can include one or more eNodeBs 206. Also shown are one or more data sources 204 in communication with the MPAS 210.

The core portion of the MPAS 210 can include service logic, e.g., the scheduler, that can include logic to accommodate time-shifting downloads to mobile devices. To that end, the core portion of the MPAS 210 can include an orchestration and/or arbitration module that identifies one or more rules for implementing, among other things, time-shifting downloads to mobile devices. To this end, the core portion of the MPAS 210 is in communication with a PCRF of the EPC 208. In at least some embodiments, the system 200 also includes APIs 224 that are mode available to device applications 226 and/or application services 228 to facilitate interactions, such as coordinating interactions, between the applications 226 and/or services 228 and the orchestration/arbitration module of the core portion of the MPAS 210.

Figure 3:
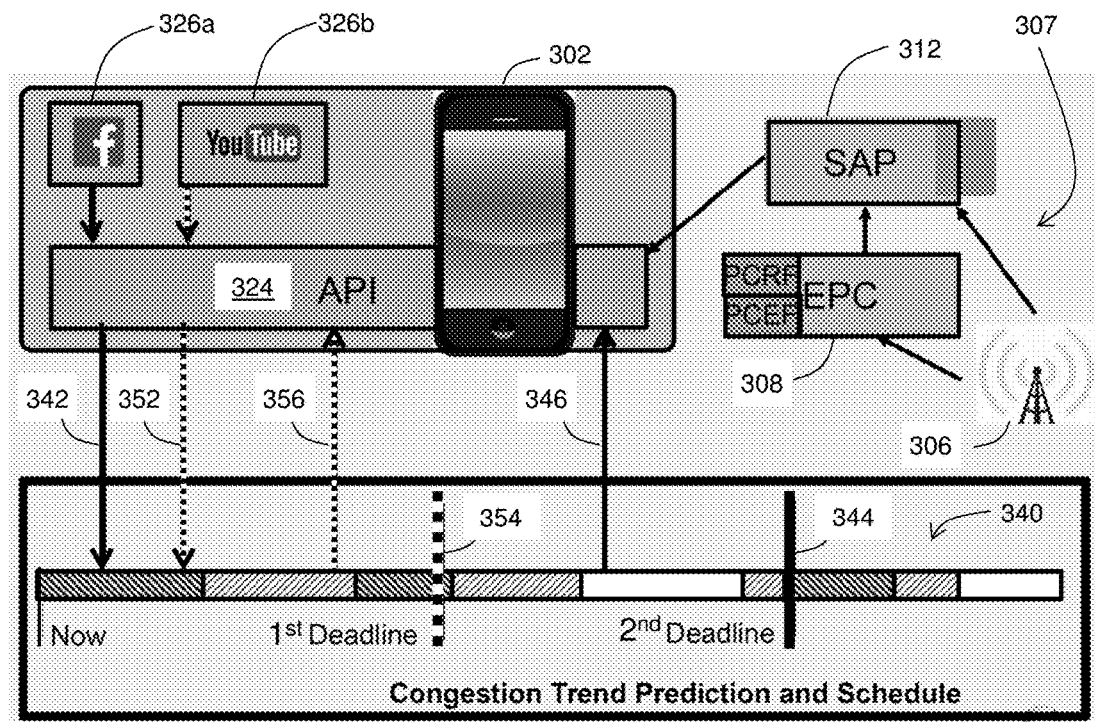
FIG. 3 depicts an illustrative embodiment of a system that time shifts data transfers of mobile devices, such as any of the systems described in FIGS. 1-2.
Figure 3:
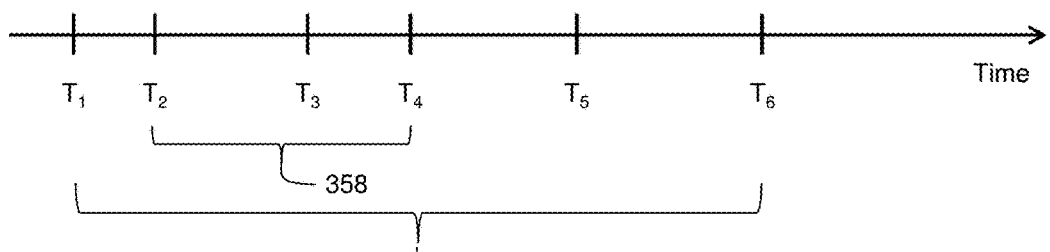
Figure 3:
Figure 3:
Figure 3:
Figure 3:
Figure 3:

FIG. 3 depicts an illustrative embodiment of a system 300 that time-shifts content downloads to mobile devices. A mobile device, such as a smart phone 302, submits a first request 342 to a content source (not shown), e.g., an online social networking service, such as Facebook®, at a first request time $T_1$. (Facebook® is a registered trademark of Facebook Inc.). The first request 342 is to download a first content item, such as a video clip made available or otherwise linked by another member, e.g., a friend, using the social networking service. A first deadline 344 can be associated with the first request 342 is identified at time $T_6$. The significance of the first deadline 344 in this example is that the requested first data content item should be downloaded to the mobile device 302 before the first deadline 344 at time $T_6$. Likewise, the smart phone 302 submits a second request 352 to a content source to download a second data content item to the same mobile device 302. The second request 352 can be made to the same content source, or another content source. The second request 352 relates to a download of a second content item, such as a video clip made available or otherwise linked by a video service, such as YouTube®. (YouTube® is a registered trademark of Google Inc.). A second deadline 354 associated with the second request 352 is identified at time $T_4$.

The deadlines 344, 354 can be identified by a user of the mobile device, e.g., by a selection or indication associated with the particular request. The deadlines can also be associated with a user preference as might be identified in a user profile, an application preference setting or the like. In some instances the deadline can be set or otherwise identified by the application 326 initiating or otherwise associated with the download request. Alternatively or in addition, the deadline can be identified by one or more of a network service provider, the scheduling server or the content provider. In some instances, the deadline is based at least in part on the content. For example, a download request can have different deadlines depending upon whether the content is primarily video content, audio content or textual content.

In some instances, the deadline can be treated as an absolute, such that download of the content item must be completed by the deadline, barring a system failure or unplanned outages. In other instances, a deadline, once established, can be changed. Such changes can be coordinated with the requesting user, application, and/or service provider. It is envisioned that any modification to an established deadline can result in a negotiation with the requesting user, application and/or service provider. For example, if the requestor is willing to relax a deadline, the requestor will be provided with something in return. Such bargaining currency can include data charges, account credits, points in a loyalty program, and so forth. Although it is anticipated that download request will often be associated with a deadline, a deadline is not required.

A mobile device, such as a smart phone 302 can include one or more application programs or "apps." The illustrative example identifies a first app 326a, e.g., Facebook®, and a second app 326b, e.g., YouTube®. Other apps can include, without limitation, web browsers, such as Safari®, streaming media services, such as Netflix®, and communication applications, such as Skype®. (Safari®, and Netflix® and Skype® are registered trademarks of Apple Inc., Netflix, Inc. and Microsoft Corporation, respectively). Requests to transfer data content can be made or otherwise managed through one or more of the apps 326a, 326b, generally 326.

A first time-shift 348 window extends between the time of the first request 342, $T_1$, and the first deadline 344, $T_6$, representing a period of time during which delivery of the first content item to the smart phone 302 can be scheduled. Likewise, a second time-shift 358 window extends between a time of the second request 352, $T_2$, and the second deadline 354, $T_4$, representing a period of time during which delivery of the second content item to the smart phone 302 can be scheduled.

The illustrative example also includes a base station utilization indicator 340. The utilization indicator 340 provides an indication of resource utilization at a particular base station 306 likely to participate in download of the requested content item during the respective time-shift period. The utilization indicator can relate to the same base station 306 used in a request of a data transfer, although it is understood that the request may be made through one base station, whereas download of the requested content can occur at one or more other base stations. A determination as to which base station will handle the download is based on one or more of a time of opportunity, e.g., when the base station has sufficient capacity and location(s) of the mobile device 302 during the respective time-shift window 348, 358. For simplicity, the illustrative example presumes that the requests 342, 352 and downloads 346, 356 are accomplished through the same base station 106.

The mobile device 302 interacts with a scheduler 312 via a mobile cellular network 307 including a core network, such as an EPC 308 for an LTE network, and one or more base stations 306, e.g., eNodeBs 306. The mobile device 302 includes an API 324 that facilitates interaction with download requests 342, 352.

It should be understood that scheduling can include partial or complete delivery of content before any request for the content is made. For example, a user and/or an application may identify information, such as a subscription to media content, pre-selection of media content, identification of advertising media content and so on. For such scenarios, content that is likely to be requested by the mobile device 102 can be transferred to the mobile device in whole or in part during periods not experiencing congestion.

The utilization indicator 340 can be based on actual utilization, e.g., at the time of the request and/or at times prior to the request. Alternatively or in addition, the utilization indicator 340 can include predictions or forecasts of future utilization. In the illustrative example, the first request 342 is received during a period of heavy congestion. Since mobile cellular networks are designed to meet some maximum demand, it is conceivable that heavy congestion could result in an undesirable overload condition. Overloads may result in dropped calls or data requests, delays, application of data throttling and the like. The utilization indicator 340 does forecast periods of lesser, moderate congestion and even light or no congestion at various times after the first request time $T_1$.

In the illustrative example, the utilization indicator 340 for the base station 306 indicates heavy congestion at the time of each of the requests 342, 352. According to the time shifting techniques disclosed herein the requested content items are downloaded at later times, during moderate to light congestion at the base station 306. For example, the second download 356 responsive to the second request 352 occurs at time $T_3$, which occurs during a period of moderate congestion before the second deadline 354. In the illustrative example, a single period of moderate congestion occurs between the second request 352 and the second deadline 254. Accordingly, the second request 352 is completed before the first request 342, even though the first request 342 was submitted earlier than the second 352. Namely, the first download 346 responsive to the first request 342 occurs at time $T_5$, which occurs during a period of light to no congestion after the second download 356 and before the first deadline 344. Had the user changed location during the time-shift windows, one or more other utilization indicators 340 would be shown indicating utilization of other base stations corresponding to the time and location of the mobile device 302.

Figure 4A:
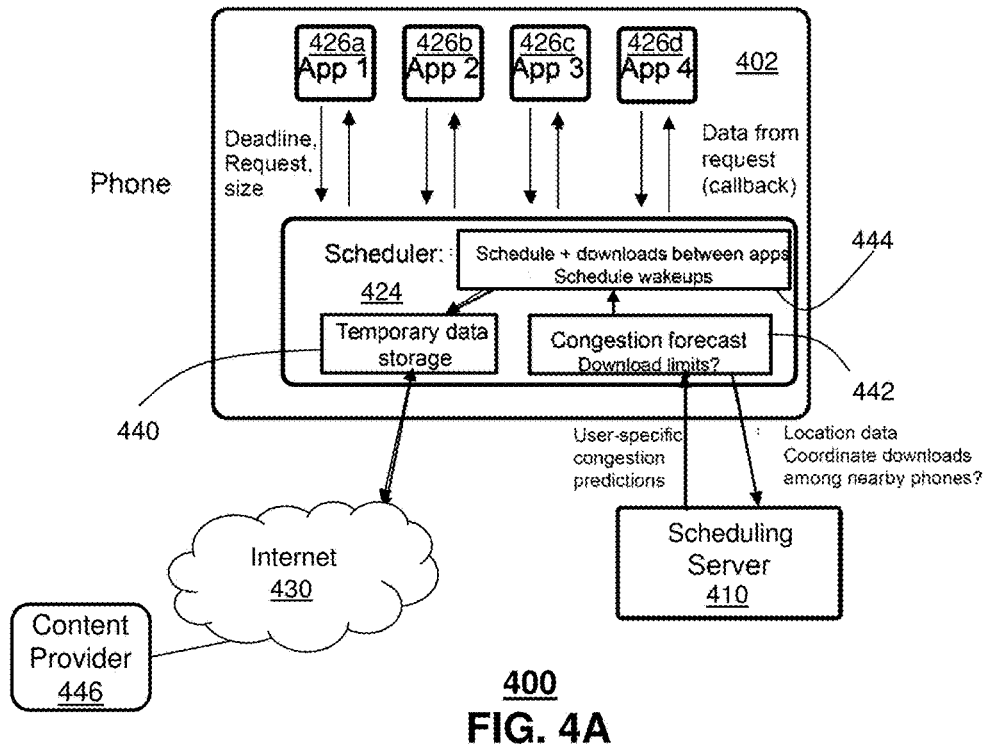
FIG. 4A depicts, in more detail, an illustrative embodiment of a system that time shifts data transfers of mobile devices, such as any of the systems of FIGS. 1-3.

FIG. 4A depicts, in more detail, an illustrative embodiment of a system 400 that time shifts data transfers of mobile devices, such as any of the systems of FIGS. 1-3. A mobile device, such as a mobile phone 402 includes a number of application programs, "apps" 426a, 426b, 426c, 426d, generally 426. The phone 402 also includes a scheduler 424 in communication with each of the apps 426. The scheduler 424 includes temporary data storage buffer 440, a congestion forecast buffer 442, and a schedule manager 444.

In operation, one or more of the apps 426 submits a request to the scheduler 424 for download of a data content item by way of a mobile cellular network. In the illustrative embodiment, the scheduler 424 submits the request to a scheduling server 410. The scheduling server 410 can be managed by another entity, such as a network service provider, a content provider, or a third party scheduling service provider.

The scheduler also submits additional information to support a scheduling analysis by the scheduling server 410. The additional information can include one or more of location data, an equipment identifier, equipment limitations, e.g., data rate limits, available storage. In some instances the request includes one or more of an identifier of the requested data content item, e.g., a file name, a location of the requested data content item, a format, classification and/or category of the data content item, e.g., video, audio and/or other, a time sensitivity associated with the request, e.g., a deadline and/or a priority. It is conceivable that the request can also include an indication that the request should not be subjected to time-shifting, and/or that there is no interest in entertaining options for time-shifting.

The scheduling server 410 can use one or more of the aforementioned information items and, in response to the download request, identify one or more opportunity for satisfying the request. Alternatively or in addition, the scheduling server 410 can provide a user-specific congestion prediction based on the details of the download request. Such a user-specific congestion prediction of forecast can include a measure of utilization, congestion and/or capacity at one or more of locations and times.

The schedule manager 444 accesses the congestion forecast and determines a schedule for downloading the data content item based on the forecast. In some embodiments, a scheduled transfer time or a number of possible scheduled transfer times are received from the scheduling server. The schedule manager 444 can identify one or more scheduled transfer times to be used by the phone 402 to download the requested data content item.

The phone 402 is in communication with a content provider 446 by way of a network 430. The phone 402 can access the Internet 430 by way of a mobile cellular network, not shown. The scheduler 424 can provide the requesting app 426 with the scheduled transfer time, so that the app 426 can submit the scheduled time-shift request at the scheduled time. Alternatively or in addition, the scheduler 424 can contact the app 426 at or just before the scheduled time, to cause the app 426 to submit a download request at that time. It is also understood that in at least some instances, the scheduler 424 can submit the download request on behalf of the requesting app 426, later coordinating access by the app 426 to the downloaded content.

Downloaded content can be stored in the temporary data storage buffer 440. Upon completion of the download, the schedule manager 444 can purge or otherwise delete information related to the scheduling of the completed download. This can include purging or deleting information from one or more of the temporary data storage buffer 424 and the congestion forecast buffer 442.

Figure 4B:
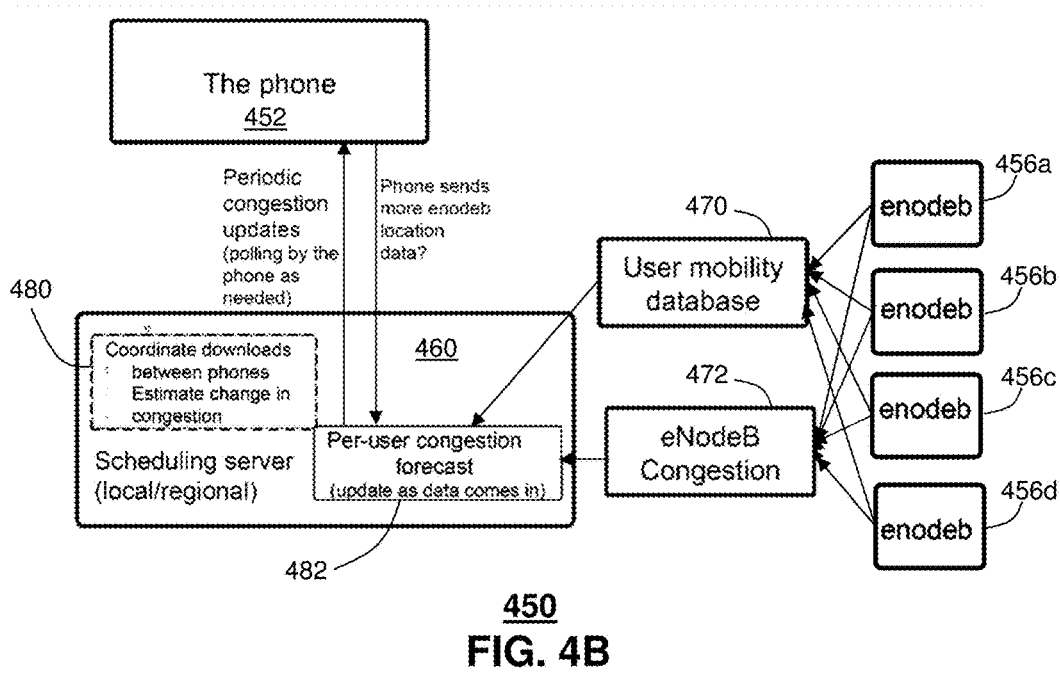
FIG. 4B depicts, in more detail, an illustrative embodiment of a system that time shifts data transfers of mobile devices, such as any of the systems of FIGS. 1-3.

FIG. 4B depicts, in more detail, an illustrative embodiment of a system 450 that time shifts data transfers of mobile devices, such as any of the systems of FIGS. 1-3. The system includes a scheduling server 460 in communication with a user mobility database 470, a base station congestion database 472 and a mobile device, such as a mobile phone. The base station congestion database 472 receive information from a number of base stations 456a, 456b, 456c, 456d, generally 456. The information can include an indicator of utilization and/or congestion for each base station 456 over a sample time window. In some instances, base station utilization information is pre-processed before being stored in the base station congestion database 472. Alternatively or in addition, raw or otherwise unprocessed utilization information is stored in the database alone or in combination with processed utilization information. For example, processed utilization information can include statistical information for each base station 426, such as an average, variance and so forth of the utilization according to times of day and/or days of the week. Such statistical information can be updated periodically based upon data collected from the base stations 456.

Likewise, the user mobility database 470 receive information from the base stations 456 that can include an indicator of access of the phone 452 and or other devices of a user of the phone 452. In some instances, the phone's presence in certain cells or locations corresponding to the base stations 456 is tracked or otherwise gathered to determine a mobility of the user according to one or more of times of day and days of the week. Once again, the mobility or location information can be processed to determine statistical information for each base station 426, such as an average, variance and so forth of the utilization according to times of day and/or days of the week. Such statistical information can be updated periodically based upon data collected from the base stations 456.

The scheduling server 460 can include a congestion forecaster 482 and, optionally, a time-shifting coordinator 480. The scheduling server 460 can receive information from the phone 452, including an indication of a download request. The scheduling server 460 can also receive information from one or more of the base station congestion database and the user mobility database 470. The congestion forecaster 482 can determine a forecast for a particular request based on the request, the requesting device 452, and information from the databases 470, 472. The congestion forecast can be performed on a per-base station basis, and can be updated as data related to any download requests is received.

In some embodiments, the scheduling server receives location data from the phone 452. Alternatively or in addition, the scheduling server 460 receives location data from one or more base stations 456 identifying a current location of the phone 452. To the extent that the scheduling server 480 is handling multiple requests from a particular phone 452, and/or from multiple phones 452, the time-shifting coordinator can provide offsets or adjustments to scheduled time-shift requests to avoid congestion induced by serving multiple requests.

Figure 5:
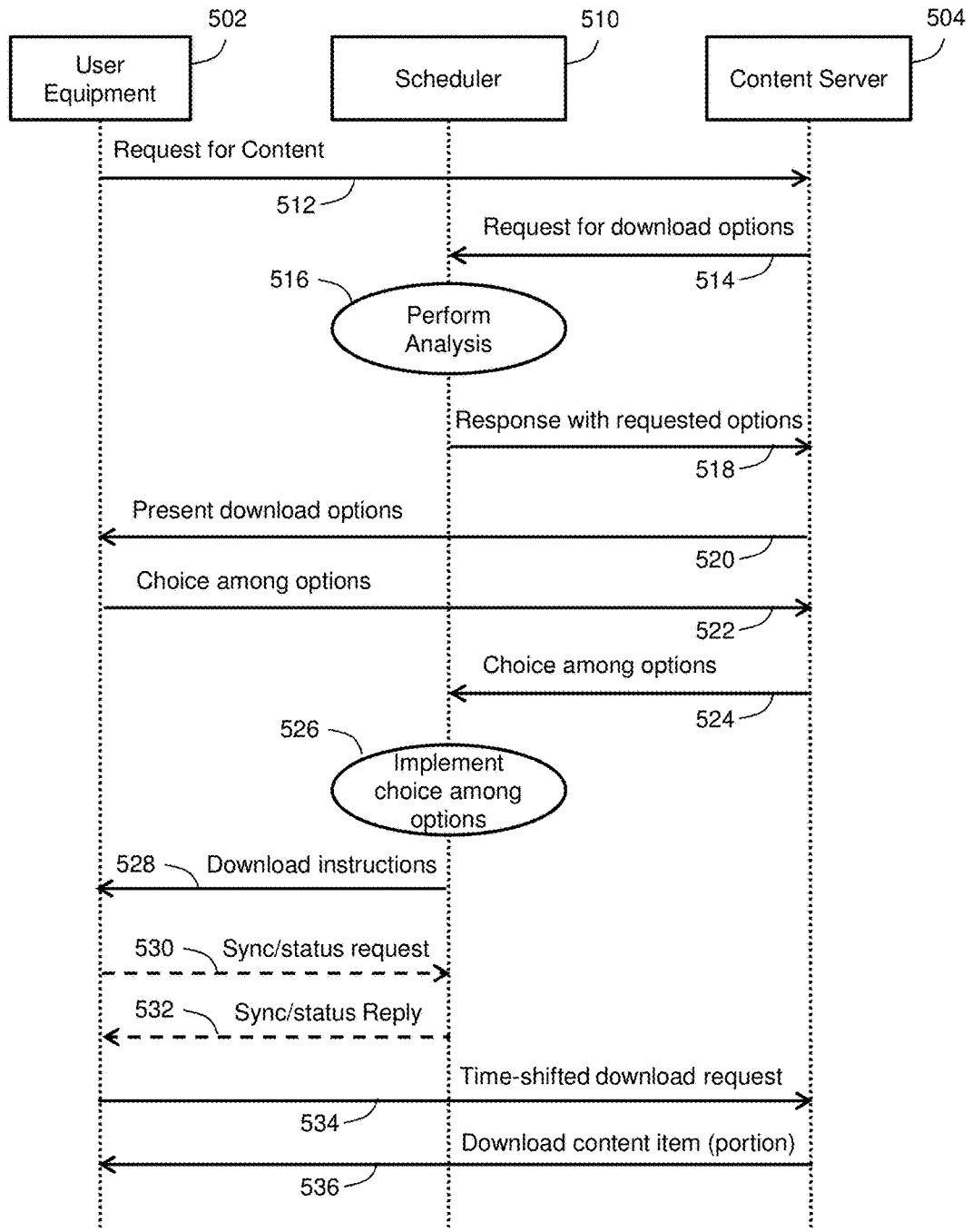
FIG. 5 depicts, in more detail, an illustrative embodiment of an example of messages exchanged in a system that time shifts data transfers of mobile devices, such as any of the systems described in FIGS. 1-3.

FIG. 5 depicts, in more detail, an illustrative embodiment of an example of messages exchanged in a system that time shifts data transfers of mobile devices, such as any of the systems of FIGS. 1-3. In the illustrative example, user equipment 502, such as a mobile device 102 (FIG. 1) submits a request for content at 512 to a content source, such as a network accessible content server 504. The content server 504 submits a request for download options to one of a scheduler 510, a network service provider or both. The scheduler 510 can perform an analysis 516, e.g., to identify download options.

In some instances a download option can be to proceed without any time-shifting. Such a no time-shift option can be provided when the network and particularly a wireless channel of a base station of a mobile cellular network in communication with the mobile device has sufficient capacity to undertake downloading of a selected content item. For situations in which sufficient capacity may not be immediately available, or for any other reason including a preference for time shifting as a general rule, the analysis determines one or more options for time-shifted download.

The scheduler 510 replies to the request 514 with one or more options 518. The content server 518, in response to the request for content and subject to results of the analysis 516 performed by the scheduler 510, presents download options at 520 to the user equipment 502. The equipment of the user 502 responds at 522 with a selection of an option. When multiple options are presented, the response 522 identifies a choice among the options. Such a choice or selection can be received by the user equipment 502 as input from a user, e.g., by way of a user interface, such as a screen selection, a voice command, a text input, a gesture and so on. Alternatively or in addition, the choice or selection can be generated by the user equipment 502, e.g., according to an application program resident on the user equipment 502. When the resident application program serves as a client in a client-server model, a server might also convey the choice or selection directly or indirectly through the application program resident on the user equipment 502.

The content server 504 submits the choice among options to the scheduler 510 at 524. The scheduler 510, in turn, implements the chosen time-shift strategy at 526. In some embodiments, implementation of the chosen time-shift strategy includes submitting download instructions at 528 to the user equipment 502. The download instructions can include a later time or times at which the user equipment 502 should re-submit the time-shifted request to initiate a time-shifted download of the earlier-requested data content item. The user equipment 502, having received instructions to download at a later time, re-submits the time-shifted download request at 534. The content server 504, in response, downloads at 536 the requested content item, or portion thereof, to the user equipment 502.

It is conceivable that the time-shifted download request at 534 can include indicia that the request was pre-scheduled according to the time-shifting techniques disclosed herein. Such indicia would allow the content server 504 to distinguish between original requests and pre-scheduled or otherwise coordinated time-shifted requests. Alternatively or in addition, the content server 504 upon receiving the time-shifted download request at 534 can request download options, as done in response to the original download request at 514. This would allow the scheduler 510 to track time-shifted request without requiring any special burden or modification to the content server, or even requirement that the request include any indicia indicating whether the request is an initial request, or a time-shifted request. The scheduler 501 can determine whether the request is a time shifted request and respond to the content server 504 accordingly, e.g., allowing the time-shifted request to proceed unhampered or otherwise without further delay.

It is also understood that due to certain unpredictability in any actual utilization, there may be instances in which a predicted time-shifted transfer time will occur during an unexpected period of heavy utilization or congestion. Alternatively, there may be instances between a request time and any scheduled time-shifted transfer time during which utilization or congestion is low, presenting an unanticipated opportunity for completing the transfer. It is also conceivable that the mobile device will move to unanticipated locations posing new opportunities for download, and/or presenting challenges for pre-scheduled time-shifted downloads.

In at least some embodiments, the user equipment 502 can submit a synchronization and/or status request at 530 to the scheduler 510. The scheduler 510 can perform an updated analysis. The updated analysis can confirm an earlier scheduled time-shift transfer time, identify other time-shifted options, revise a deadline, and/or present revised options based on current conditions and/or updated forecasts. Results of any such updated analysis can be presented at 532 to the user equipment 502. In some instances, the reply 532 might indicate no change to earlier presented options and/or time-shift transfer time(s). It is important to emphasize that this is one example use case. Another would be for the APIs on the device to query (instead of the content server).

Figure 6A:
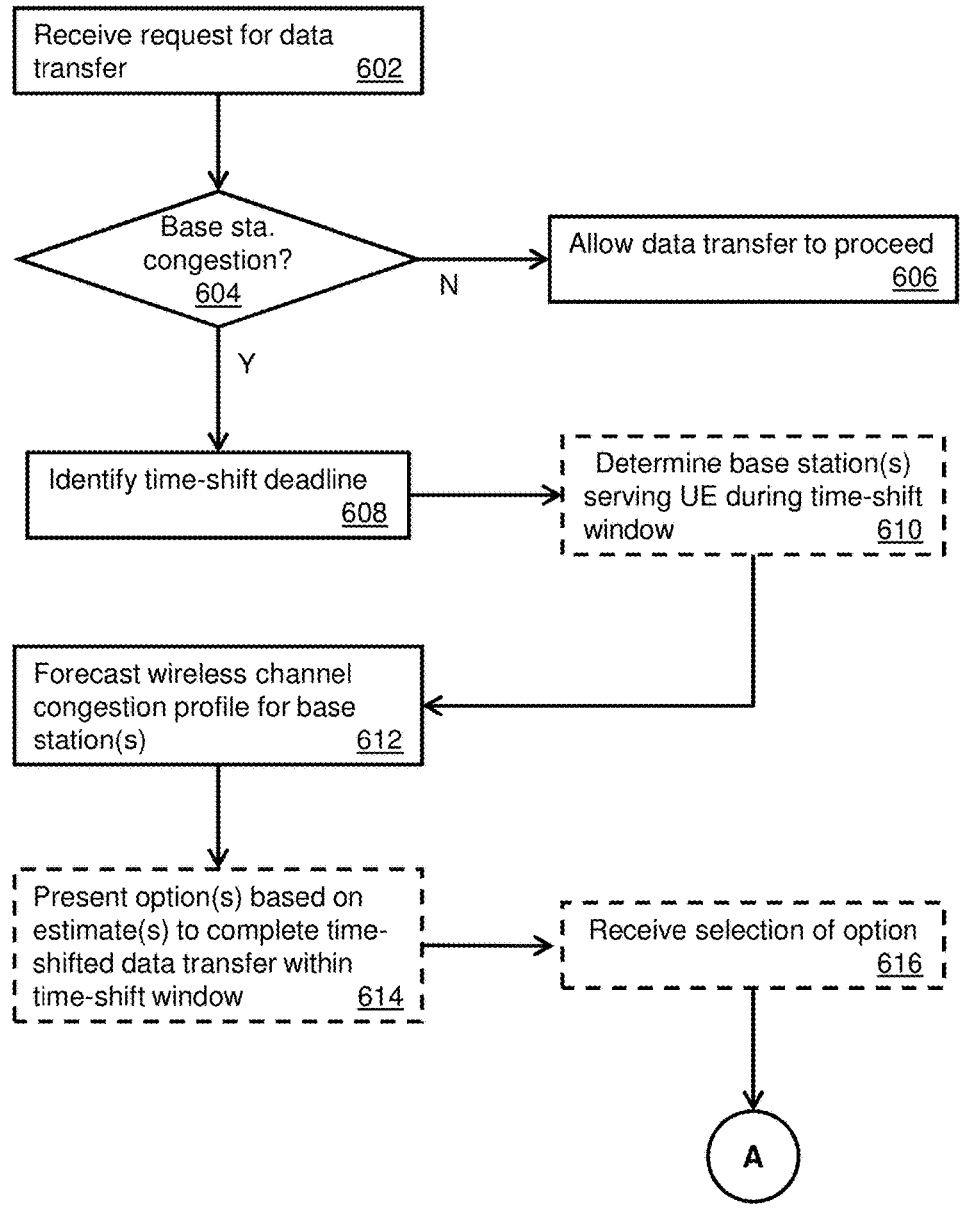
FIGS. 6A and 6B depict an illustrative embodiment of a process used in portions of the system described in FIGS. 1-4A and 4B.

FIG. 6 depicts an illustrative embodiment of a process 600A used in portions of the system described in FIGS. 1-5. A request for a data transfer is received at 602. A determination is made at 604 as to whether the base station is experiencing congestion, e.g., according to a relatively high utilization of available wireless resources, such as a wireless channel providing a physical connection to a mobile device. To the extent that the base station is not experiencing congestion, e.g., the wireless channel has sufficient capacity, perhaps including a minimum overhead, to accommodate downloading of the requested content item without delay, downloading of the content item is allowed to proceed at 606 with little or no delay. To the extent that the base station is experiencing at least some congestion, a time shift deadline is determined at 608. The time-shift deadline can be provided by one or more of a user of the mobile device, by the mobile device itself, by an application program running on the mobile device, by the content server, or by a mobile cellular network carrier. To the extent multiple deadlines are received, a priority can be pre-established among the aforementioned entities.

In some embodiments, a determination is made at 610 to determine one or more base stations actually and/or expected to service the mobile device during a time-shift window, e.g., between a time of the request and the deadline. Identification of base stations can be estimated or otherwise forecast from stored records of past mobility of the user equipment, or a user of the user equipment. Such mobility can be obtained from various sources, including historical cellular communications, GPS data, calendars, schedules, presence information and so on.

An estimate or forecast can be obtained at 612 for a congestion profile, a utilization profile, or some other suitable indication of usage and/or available capacity for one or more of the base stations identified at 610. Identification of congestion or utilization can be estimated or otherwise forecast from stored records of past activity of the base station, and particularly of past activity of wireless channels of the base station. Such utilization records can be obtained from various sources, including historical cellular communications, centralized network tracking, and so on.

In some embodiments, one or more options are identified at 614 based on estimate(s) to complete time-shifted data transfer within the time-shift window. The options can be presented, e.g., to user equipment, such as the mobile device. A To the extent options are provided, an indication of a selection of an option is received at 616.

Figure 6B:
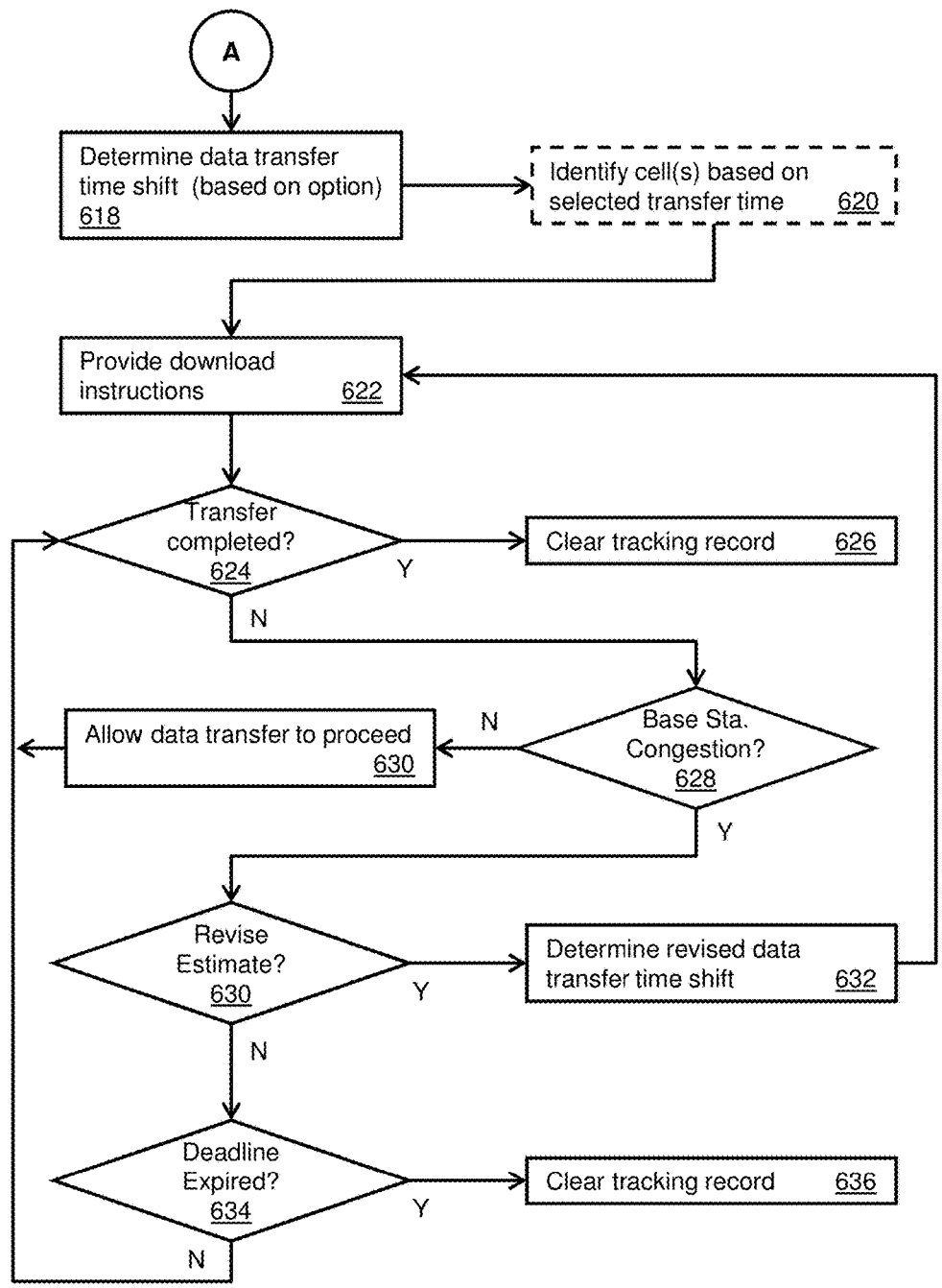

Referring next to FIG. 6B depicting an illustrative embodiment of a process 600B representing an extension of the aforementioned process 600A, also used in portions of the system described in FIGS. 1-5. A data transfer time shift is determined at 618. One or more base stations expected to be available to the mobile device during the time-shift window can be identified at 620. Data transfer, or download instructions can be provided at 622. A determination is made at 624 as to whether transfer of the requested date content item has been completed. To the extent that the transfer has been completed, a tracking record can be cleared at 626.

To the extent that the transfer has not been completed, a determination can be made at 628 as to whether congestion exists at the base station indicating a relatively high utilization. To the extent that there is no congestion, the transfer of the requested data content can be allowed to proceed at 630. To the extent the data transfer is allowed to proceed, the process 600B continues to check whether the transfer is complete at 624.

Figure 7:
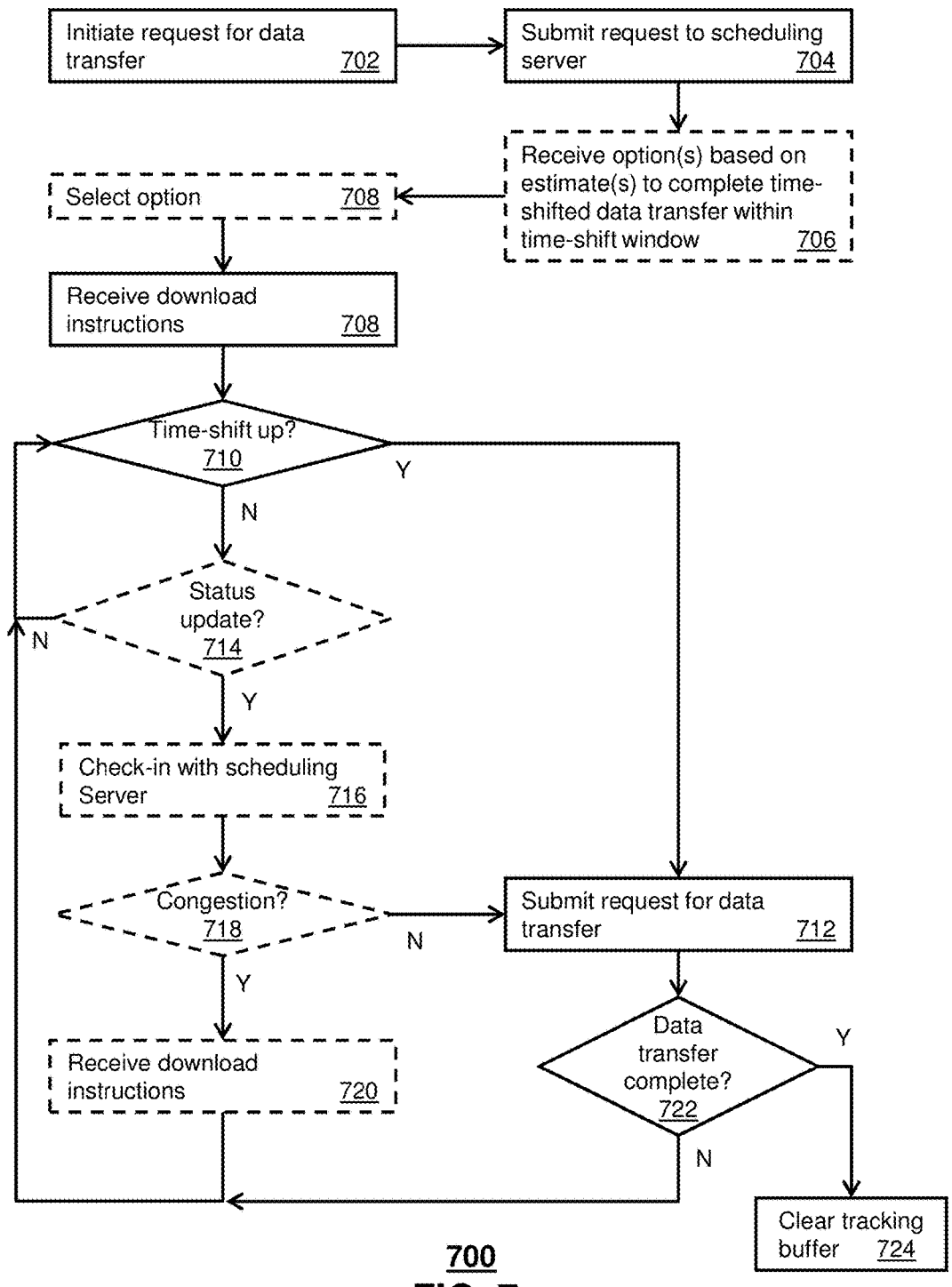
FIG. 7 depicts an illustrative embodiment of a process used in portions of the system described in FIGS. 1-4A and 4B.

FIG. 7 depicts an illustrative embodiment of a method used in portions of the system described in FIGS. 1-5. A request for transfer of a data content item is initiated at 702. The request is submitted to a scheduling server at 704. In some embodiments, one or more options to fulfill the request according to a time-shifted transfer of the requested data content item are presented at 706. Such options can be based on one or more estimates of base station utilization and analyses to determine whether transfer of the requested data content item can be completed before any applicable deadline.

Instructions related to the time-shifted download are received at 708. A determination is made at 710 as to whether a pre-schedule time according to the time-shift has occurred. To the extent that the time-shift has occurred, indicating that it is time to transfer the requested data content item according to the time-shift, a request for the data transfer is submitted at 712. To the extent that the time-shift has not yet occurred, a determination can be made at 714 as to whether a status update should be submitted.

To the extent that a status update will not be submitted, the process 700 returns to check wither the time shift period is up at 710. To the extent that a status update will be submitted, an inquiry is submitted to the scheduling server at 716. In response to the inquiry, the scheduling server can determine utilization at the base station serving the mobile device. The scheduling server can return an indication of utilization or congestion of the base station. In some embodiments, the scheduling server can revise or otherwise re-perform an analysis to identify updated or new options based on the revised analysis. Although periodic check-ins can allow content to be scheduled effectively when long-term user location forecasts do not exist, it is understood that content with long deadlines can still be scheduled effectively by making short-term predictions as described in more detail herein below.

A determination can be made at 718 as to whether the base station is experiencing a relatively high utilization or congestion. To the extent that utilization is low, a request for the data transfer can be submitted at 712. This can result in a pre-scheduled time-shift download being completed prior to a pre-scheduled, time-shifted download time based on available capacity of the network. Providing features to take advantage of such opportunities can benefit system efficiency by clearing out scheduled time-shifted downloads earlier rather than later. This would result in additional capacity for other scheduled time-shift download requests from the same or different mobile devices.

To the extent that utilization is high, the scheduling server can revise or otherwise re-perform an analysis to identify updated or new options based on the revised analysis. Such updated options can optionally be received at 720. The process 700 continues to return to check wither the time shift period is up at 710.

After a request for time-shifted data transfer has been submitted at 712, a determination can be made at 722 as to whether the data transfer, or download is complete. To the extent the download is complete, any tracking or status information, e.g., as can be stored in a tracking buffer is cleared or otherwise marked as completed at 724. To the extent the download is not complete, the process 700 continues to return to check wither the next time shift period is up at 710. Multiple time-shift periods can be presented in some instances to accommodate a segmented transfer of one data content item.

Figure 8:
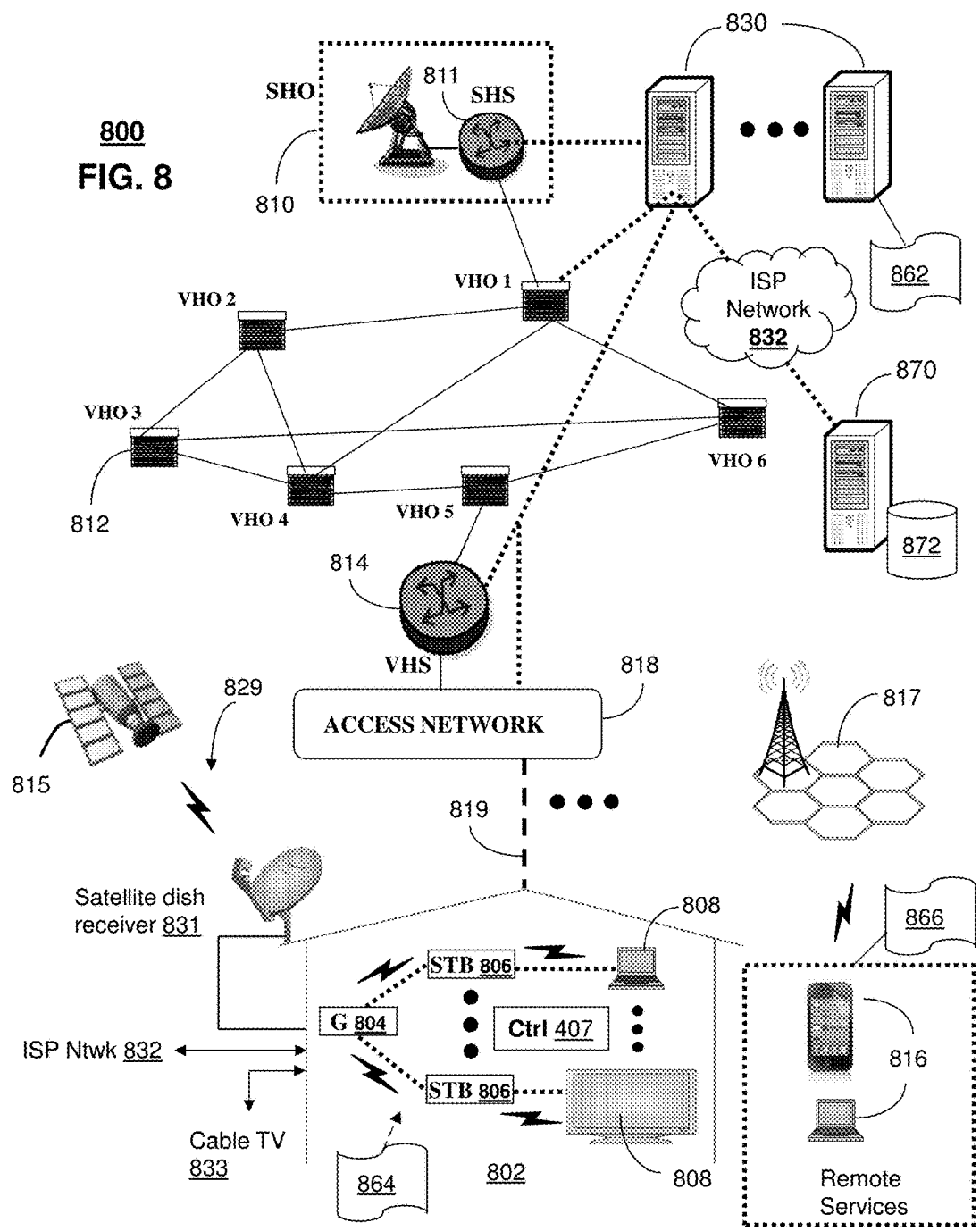
FIG. 8 depicts an illustrative embodiment of a communication system that provide media services, including time shifted data transfers with mobile devices described in FIGS. 1-4 A and 4B.

FIG. 8 depicts an illustrative embodiment of a first communication system 800 for delivering media content. The communication system 800 can represent an Internet Protocol Television (IPTV) media system. Communication system 800 can be overlaid or operably coupled with systems that time shift data transfers of mobile devices of FIGS. 1-5, as another representative embodiment of communication system 800. For instance, one or more devices illustrated in the communication system 800 of FIG. 8 can receive a first request from a mobile device 816 for a transfer of a data content item to the mobile device 816 before a time limit, wherein the first request is received at a first time by way of a first base station 817 in wireless communication with the mobile device 816. The data content item can be transferred or downloaded from a content source, such as a content server 870 in communication with a content repository 872. A location is forecasted of the mobile device 816 during a time period between the first time and the time limit and a candidate base station 817 is identified, based on the forecasted location. Utilization of the candidate base station 817 is forecasted during the time period and a transfer time is determined within the time period based on the forecasted utilization and the deadline. The transfer time is provided to the mobile device 816, wherein the mobile device can initiate the transfer of the data content item by way of the candidate base station 817.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a scheduling server (herein referred to as scheduling server 830). The scheduling server 830 can use computing and communication technology to perform function 862, which can include among other things, the time-shifting techniques described by processes 600A, 600B of FIGS. 6A, 6B. For instance, function 862 of the scheduling server 830 can be similar to the functions described for servers 110, 210, 312, 410, 460 of FIGS. 1-4A and 4B in accordance with processes 600A, 600B of FIGS. 6A, 6B. The media processors 806 and wireless communication devices 816 can be provisioned with software functions 864 and 866, respectively, to utilize the services of the scheduling server 830. For instance, functions 864 and 866 of media processors 806 and wireless communication devices 816 can be similar to the functions described for the mobile devices 102, 202, 302, 402, 452 of FIGS. 1-4A and 4B in accordance with processes 600A, 600B of FIGS. 6A, 6B.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
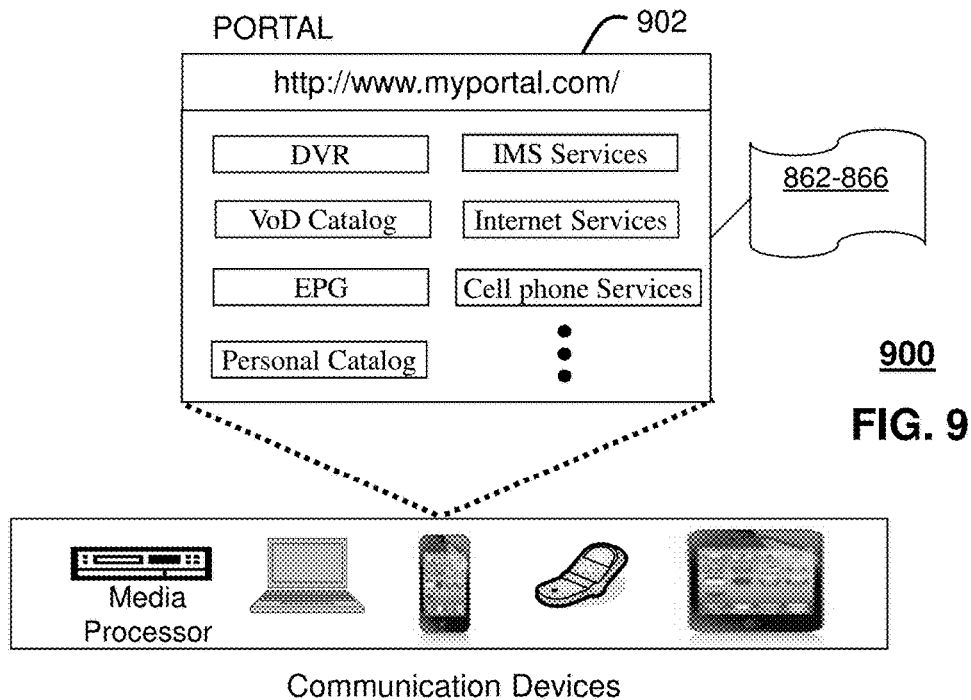
FIG. 9 depicts an illustrative embodiment of a web portal for interacting with the communication systems described in FIGS. 1-4A, 4B and 8.

FIG. 9 depicts an illustrative embodiment of a web portal 902 of a communication system 900. Communication system 900 can be overlaid or operably coupled with systems 100, 200, 300, 400, 450 of FIGS. 1-4A and 4B, and/or communication system 800 as another representative embodiment of systems 100, 200, 300, 400, 450 of FIGS. 1-4A and 4B, communication system 800, and/or communication system 500. The web portal 902 can be used for managing services of systems 100, 200, 300, 400, 450 of FIGS. 1-4A and 4B and communication systems 800-500. A web page of the web portal 902 can be accessed by a Uniform Resource Locator (URL) with an Internet browser using an Internet-capable communication device such as those described in FIGS. 1-4A, 4B and FIG. 8. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 862-866, to adapt these applications as may be desired by subscribers and/or service providers of systems 100, 200, 300, 400, 450 of FIGS. 1-4A and 4B, and communication systems 800 of FIG. 8. For instance, users of the services provided by scheduling server 110, 210, 312, 410 or server 830 can log into their on-line accounts and provision the servers 830 with user profiles, for example, provide contact information to the server to enable it to communication with devices described in FIGS. 1-4A, 4B, 8, and so on. Service providers can log onto an administrator account to provision, monitor and/or maintain the systems 100, 200, 300, 400, 450 of FIGS. 1-4A and 4B or server 830 of FIG. 8.

Figure 10:
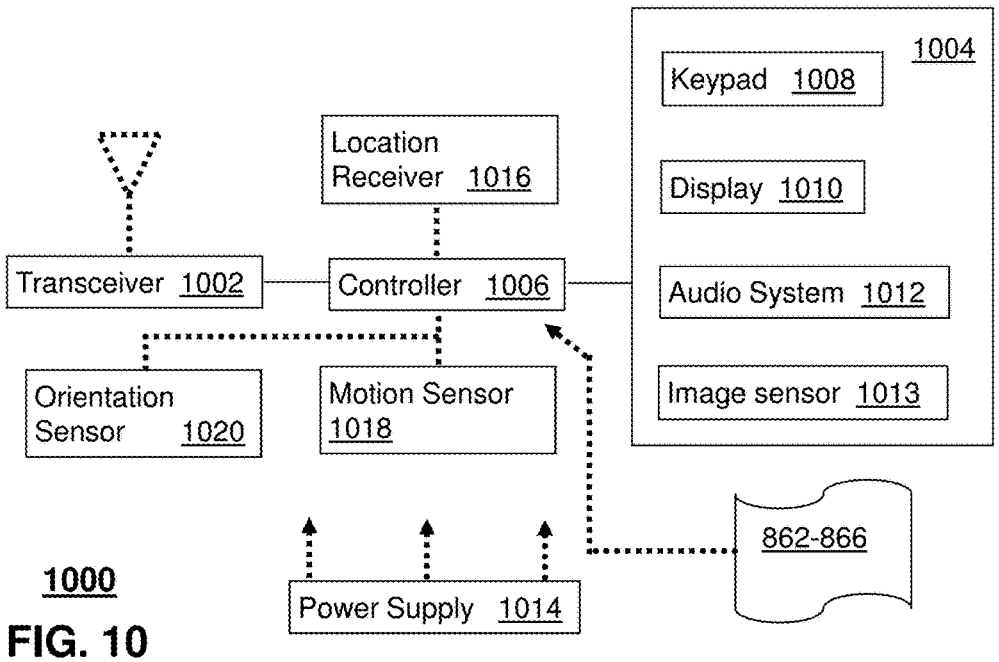
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-4A and 4B, and FIG. 8 and can be configured to perform portions of the processes 600A, 600B, 700 of FIG. 6A, FIG. 6B and FIG. 7.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of elements of the systems 100, 200, 300, 400, 450 of FIGS. 1-4A and 4B, such as the scheduling server, the mobile device, the media processor 806, the media devices 808, or the portable communication devices 816 of FIG. 8. It will be appreciated that the communication device 1000 can also represent other devices that can operate in systems 100, 200, 300, 400, 450 of FIGS. 1-4A and 4B, communication system 800 of FIG. 8, such as a gaming console and a media player. In addition, the controller 1006 can be adapted in various embodiments to perform the functions 862-866.

Figure 11:
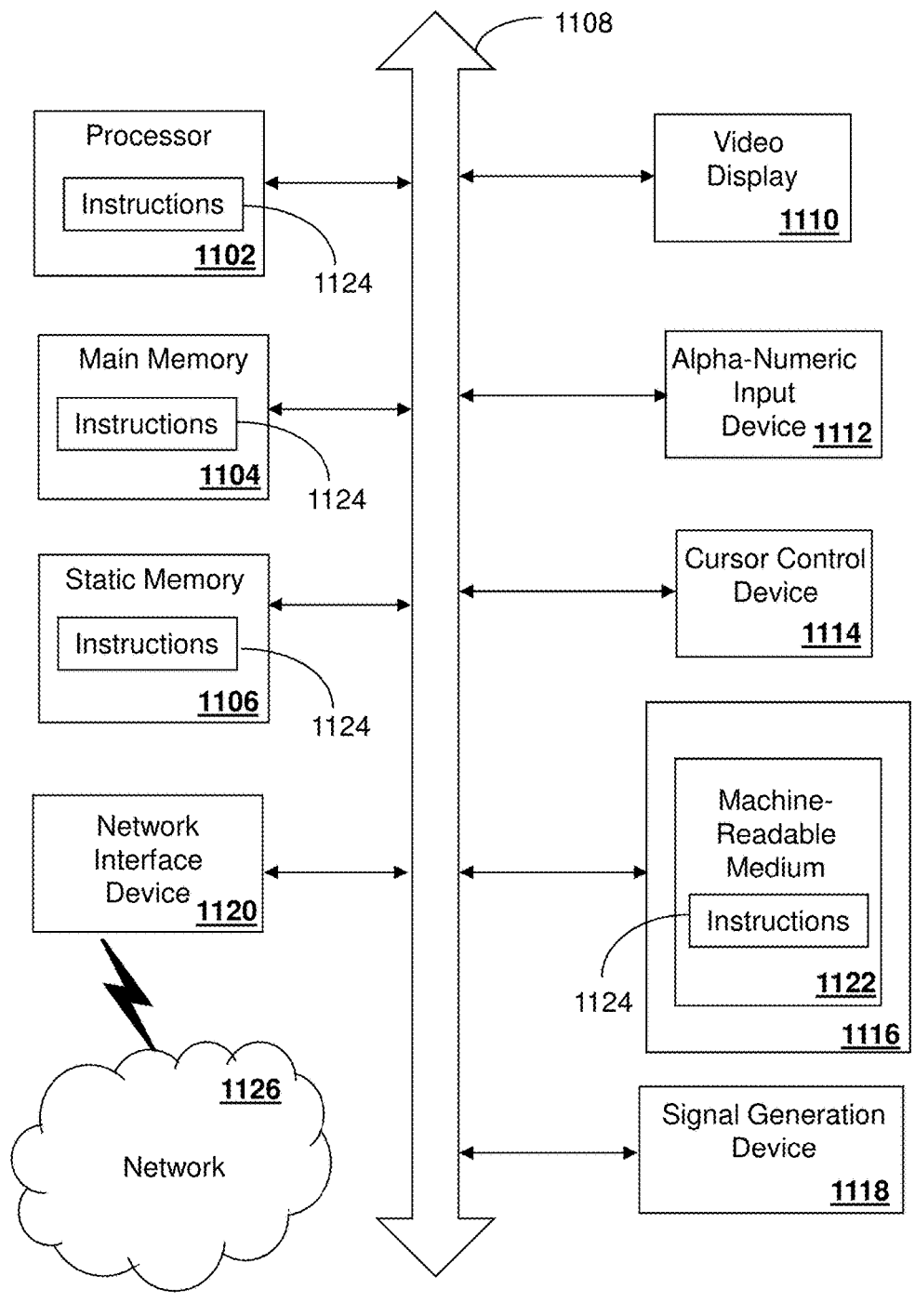
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the scheduling server 830, the media content server 870, the mobile device, a network element, e.g., of the network service provider, a base station and other devices of FIGS. 1-4A, 4B and FIG. 8. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

There are a number of fundamental challenges in time-shifting data to/from mobile devices. For example, network loads vary greatly over time, especially as mobile devices are likely to move throughout the day. Even if a substantial amount of data can be scheduled in advance, there will always be a large and changing amount of time-sensitive traffic which is not known in advance. In scheduling data, the approach ensures that any rescheduling avoids simply moving peaks around. Additionally, scheduling time-shifted mobile data transfers accounts for user mobility. Users are not stationary, potentially moving in an unpredictable manner to different base stations on the scale of regions, e.g., cities. As mobile devices are battery and data constrained, the process of scheduling mobile data transfers avoids unnecessary overhead of coordination between devices, preferably keeping such overhead to a minimum.

The techniques disclosed herein schedule time-shifted mobile data transfers that users or apps designate as delay-tolerant away from busy times. Variations in network load are leveraged over time and between eNBs. Many classes of traffic can be pre-fetched to improve user performance, and users would be willing to delay large classes of traffic if offered the right incentives. This delay-tolerant traffic can vary according to application capability and/or according to user preference, but once it has been identified, the techniques disclosed herein can effectively schedule this type of traffic, substantially reducing peak network load without introducing significant overhead. This delay-tolerant traffic might be subject to deadlines, either set by users, due to application constraints such as those in ad networks, or suggested by application hints.

Time shifting of mobile data transfers can be accomplished by making short-term decisions at a per-eNB granularity. Devices periodically submit requests to a per-eNB coordinator, which forecasts a total network load over a scheduling period, e.g., over the next few minutes (including load due to unknown data). The per-eNB coordinator determines how much data can be scheduled to meet its goals, prioritizes requests, e.g., based on heuristics, according to how urgently each request should be completed, then advises each mobile device to complete requests accordingly. A so-called "greedy", local approach is highly effective at achieving strong results for requests with deadlines of hours at the city scale. Downloading as much data as can safely be downloaded now, e.g., within a current scheduling window, without adding a new utilization spike, ensures that the data will not need to be downloaded later when adding a utilization spike may become unavoidable.

Through traces from a real network, an example system is evaluated at a scale of a large city. The impact that delay-tolerant data has on peak eNB utilization—time-sensitive data cannot be moved, and thus the time-sensitive load constrains how much network utilization can be reduced. Depending on the ratio of delay-tolerant to time-shiftable data, the impact of the delay-tolerant load can be reduced by 50% or more. The techniques disclosed herein remain effective under a large range of network loads and scheduling constraints. An evaluation of an example system employing the time-shifting techniques disclosed herein has demonstrated that for a mobile device actively time-shifting data throughout the entire day, scheduling downloads provides a battery overhead of no more than 1.8% per day and signaling overheads of about 500 KB per day.

Time-shifting delay-tolerant traffic is highly effective at improving network capacity. Coordination between devices, even if infrequent, e.g., on the order of a few seconds, tens of seconds, a minute, several minutes, tens of minutes or even hours, greatly improves an ability to leverage variations in network load over time and between eNBs in cellular networks. Depending on the amount of delay-tolerant data in the network, its impact on the system can be reduced by 50% or more in terms of maximum network utilization per eNB.

Using data from a large U.S. carrier, it has been observed that network utilization can be effectively predicted to about 15 minutes in advance leveraging both diurnal and short-term load trends with a median error of 2% of total eNB resources. On a per-user basis, network trends can be predicted up to a day in advance with an 8% utilization error, leveraging diurnal trends only.

Leveraging the findings from this carrier, a lightweight, scalable system suitable for resource-constrained mobile devices was evaluated.

Results of an evaluation of long-term prefetching under a range of scheduling constraints and delay-tolerant and time-sensitive data loads are provided herein, demonstrating that time-shifting remains effective under a wide range of circumstances. The approach may offer limited improvements under certain conditions, e.g., when data loads are already very evenly spread with low peak-to-valley ratios, or congestion too high to offer time-shifting opportunities.

At a high level, applications or users have content that they would like to time-shift, with each request being due at a given time. These deadlines may be chosen based on forecasts, or due to user or application constraints. An on-device API is provided to which applications can submit requests, so that loads can be spread to avoid latency peaks from these requests subject to the specified deadlines.

Scheduling content effectively is challenging. The mobile device might move between base-stations, and though general diurnal trends can be forecast, forecasting utilization hours in advance is only accurate to within about 8% network utilization on average for a city-scale network. This level of error means data in the network not scheduled or otherwise unknown can be unpredictable. This unknown data can be considered when scheduling requests. Furthermore, other devices on the network also schedule traffic, presenting a risk that scheduling data at the same time as other devices, creating a new utilization spike. To deal with such challenges, a coordination server that schedules at per-eNodeB granularity helps devices determine how much data they can safely schedule at any point in time.

This coordination server receives requests from all devices on the network, prioritizes the requests, and schedules enough data to get close to a target threshold without exceeding it. It estimates what the network utilization will be in the next scheduling slot, and tries to fill in the utilization valleys without increasing any peaks. By doing so, it minimizes the amount of future traffic each device will have to download, and thus minimizes the amount of data that could potentially increase the maximum utilization while reducing the peak-to-average ratio. This "greedy" approach effective scheduling decisions to be made without having to accurately predict a device's future location or data demands. Thus, a short-term, local decision making approach results in very beneficial long-term, global results. Furthermore, when deadlines are on the order of hours, these decisions only need to be made every few minutes.

Figure 12:
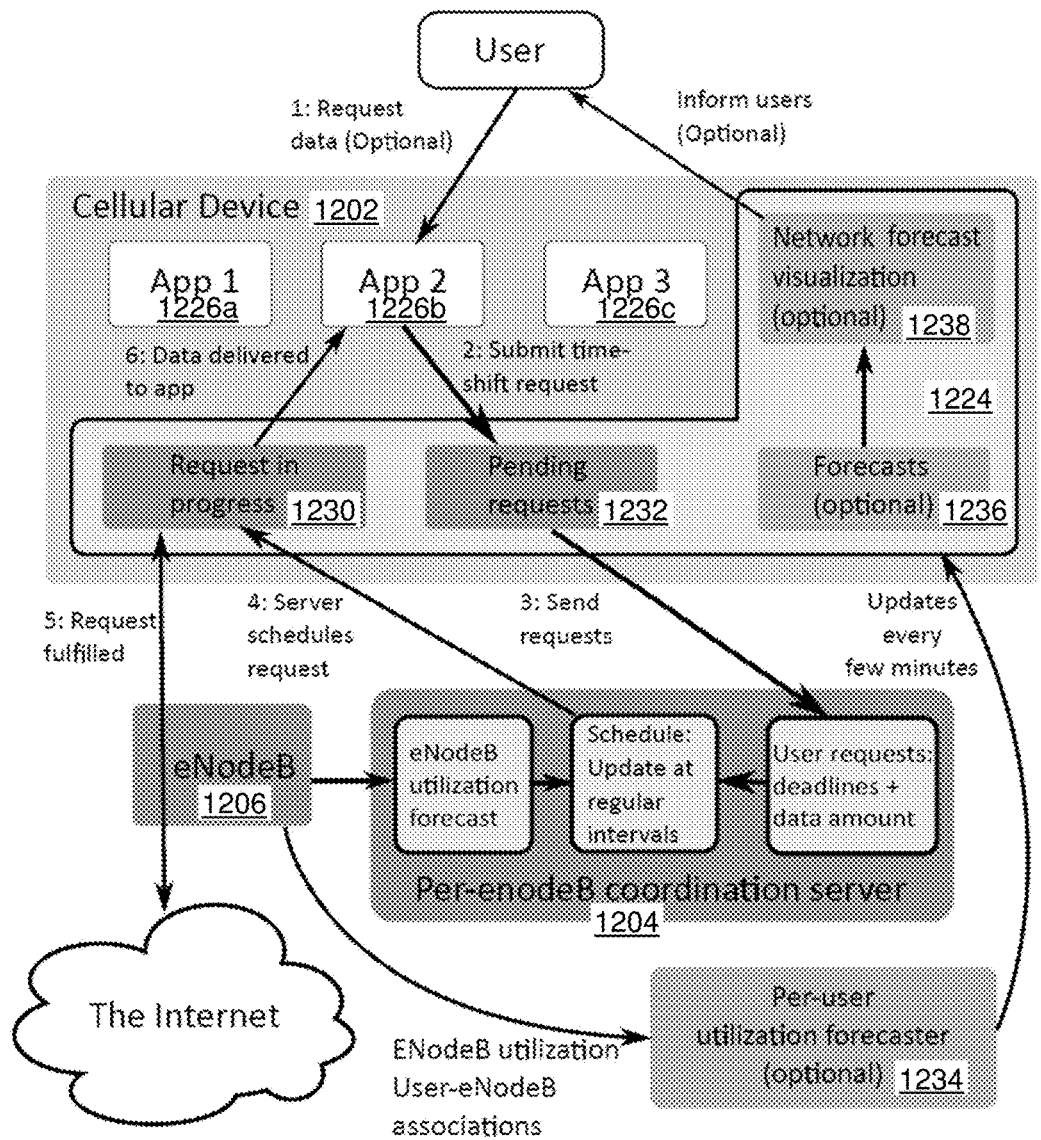
FIG. 12 depicts an illustrative embodiment of a system that time shifts data transfers of mobile devices.

An example system architecture 1200 is shown in more detail in FIG. 12. The system architecture 1200 includes one or more mobile devices 1202 in communication with one or more eNBs 1206. The mobile device 1202 includes one or more apps, e.g., App1 1226a, App2 1226b, and App3 1226c. The device 1202 further includes a request-in progress buffer 1230 storing or otherwise tracking requests in progress and a pending-request buffer 1230 storing or otherwise tracking pending requests. In at least some embodiments, the device 1202 includes a network utilization forecast visualization module that receives per-user forecasts from a per-user utilization forecaster 1234 that are stored or otherwise tracked in a network utilization forecast buffer 1236.

The one or more eNBs 1206 are in further communication with a coordination server 1204, sometimes referred to as a scheduler 1204, that determines or otherwise obtains from a separate utilization forecaster a forecast of network utilization for each eNB. The coordination server 1204 receives requests from one or more mobile devices 1202. It is understood that such request can in at least some instances include one or more of deadlines and data amounts. The coordination server 1204 further includes a scheduler that receives eNB utilization forecasts and data transfer requests, and prepares a schedule for time-shifting data transfers to satisfy the requests. In at least some embodiments, the coordination server 1204 prepares schedules according to a per-eNB granularity. The schedule can be updated periodically, e.g., at regular intervals or irregular intervals referred to as scheduling windows or scheduling slots.

In an illustrative example, the applications 1226a, 1226b, 1226c, generally 1226, submit requests to an on-phone API 1224, potentially with input from users. Traffic related to transfers that can be time-shifted can be referred to as delay-tolerant; whereas, traffic that cannot be time-shifted can be referred to as time-sensitive. As to which category, delay-tolerant or time-sensitive, data can be designated as delay-tolerant by a request from equipment of the mobile user and/or the app 1226. The on-phone API 1224 can batch requests from the different apps 1226 on the device 1202. The requests can be low-overhead, e.g., including one or more of a request size, a deadline set by the user or the application, and an identifier, such as a unique request ID. The request deadlines can be proposed by the scheduler 1204 as well, using user-specific utilization forecasts. The API 1224 also ensures that requests are completed by the deadline.

Periodically, the on-phone API 1224 synchronizes with the coordination server 1204. When prefetching data on a scale of hours, synchronizing on a scale of a few seconds, tens of seconds, minutes, e.g., one minute, a few minutes, ten minutes, or even tens of minutes, can be sufficient. The coordination server 1204 can optionally be separate for each eNB 1206 as analysis at each eNB 1206 can be done in parallel. When devices 1202 synchronize with the server 1204, they can be sent a list of requests (e.g., in the form of the unique request IDs) that may complete in this time interval, and the server 1204 records any pending requests that are not being fulfilled for when it next schedules data. Synchronizing can be periodic, e.g., according to a fixed and/or regular schedule. Alternatively or in addition, a greater efficiency can be realized with the coordination server 1204 sending push notifications only when the device 1202 has data scheduled to download, instead of the regular coordination. For such push applications, the device 1202 would otherwise only need to communicate with the server 1204 to submit new requests or when joining a new eNB 1206.

The coordination server 1204 divides up time into scheduling intervals, slots or windows. When scheduling data on the order of hours, these intervals can be on the order of minutes, or even less than one minute. The server 1204 estimates the average network utilization at the eNB 1206 over the next interval, determines how many requests are at their deadline and must complete in the next interval, and then, if there is any network capacity left, schedules as much data as possible without increasing the eNB's maximum utilization over the next interval only. The coordination server 1204 also collects data from the eNB 1206 about the eNB's current utilization to build a model of the utilization that is likely to be seen in the future. Network utilization that is accurately predicted to only a few minutes in advance can be long enough to schedule data in a scheduling or forecast interval. Optionally, a separate forecaster 1234 builds a per-user model of the utilization each device 1202 is likely to see in the future, to help inform time-shifting decisions made by users or applications. Informing users about congestion trends can be combined with offers of incentives to motivate them to shift data.

Figure 13:
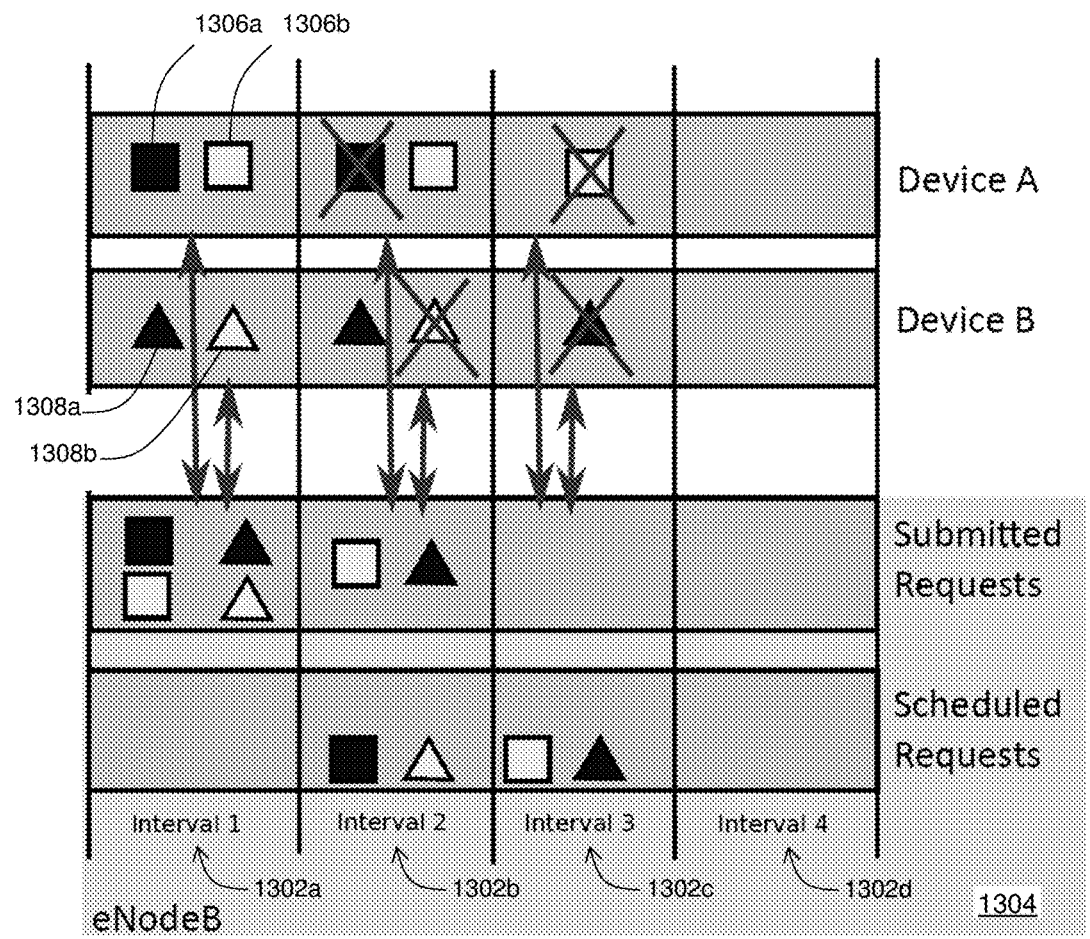
FIG. 13 depicts a an illustrative embodiment of time shifting of mobile device data transfers according to any of the systems described in FIGS. 1-4A, 4B, 8 and 12.

An example of a timeline 1300 of two devices scheduling data in FIG. 13. Device A and device B, each have two requests 1306a, 1306b and 1308a, 1308b, respectively, which they submit during a first time or scheduling interval 1302a. At the end of the first time interval 1306a, the eNB generates a schedule based on those requests 1306a, 1306b, 1308a, 1308b, then clears the request list. Device A submits the requests 1306a, 1306b again in the next time interval 1302b and is informed that its requests 1306a, 1306b should be completed. Device B also submits its requests 1308a, 1308b again, but only one request 1308a is fulfilled: the second request 1308b is stored, e.g., by the server which can attempt and schedule the second request 1308b in the next time interval 1302c. Larger data requests, such as videos, can be divided into chunks of byte ranges and each chunk can be scheduled at separate times, or series of consecutive chunks can be scheduled as a collective data segment.

As mentioned above, scheduling can be done in a greedy, short-term manner, with data only being scheduled over the next few minutes. During each time slot 1302 the server schedules data based entirely on requests submitted by the mobile device during the previous time slot 1302. No persistent, long-term scheduling is needed, allowing for easy adaptation to unexpected user movement and network utilization trends.

Each eNB can schedule user requests with the per-eNB scheduling server implementing a goal of getting as close as possible to the eNB's maximum threshold during each time interval, without exceeding the threshold. The threshold can be set to be equal to a maximum utilization the eNB has seen in the past. Keeping the load below this threshold is essential to reducing maximum utilization, but under-scheduling data in a present time slot may result in the threshold being exceeded in a later time slot. If a deadline is reached during a highly congested time and there remains data to be scheduled, then the threshold will need to be exceeded.

To determine how much can be safely scheduled the utilization due to time-sensitive traffic in the next time slot is estimated first, based on past eNB data—scheduling of delay-tolerant data can be accounted for separately. A small buffer can be applied to one or more of the threshold or the scheduling based on forecast accuracy to reduce chances of inadvertently underestimating the utilization and scheduling too much data.

Having determined how much additional load to add to the eNB, the scheduling server determines what request to schedule. Some requests have an immediate deadline occurring during the next time interval and thus should be scheduled immediately. An estimate of a current network utilization can be adjusted accordingly, to account for those requests at their deadline, assuming these requests will be fulfilled. Meeting these deadlines can be prioritized, although if some requests have "soft" deadlines, e.g., that can be changed or delayed further, results can be improved further by ensuring that a utilization threshold is not exceeded even if it means not meeting the deadlines. If there is any gap remaining between the estimated network load and the threshold, then additional data can be scheduled.

To prioritize what requests to schedule first, two metrics are evaluated. A first metric accounts for per-user forecasts to prioritize downloads: counting the number of times each user will be below the current eNB threshold, and sorting requests based on the number of such time slots. According to another metric, requests are ordered by a time-until-deadline, without using user-specific forecasts. In practice the two approaches have been found to give similar results.

At the end of each forecasting interval, the actual average load in that interval is determined, to see if the threshold should be adjusted. If the actual average load exceeded the previous maximum utilization threshold because of forced schedule requests due to complete immediately, the threshold can be raised to that induced by such mandatory downloads. However, if the previous threshold was exceeded due to underestimating the load, the target threshold is not increased. Otherwise, such increases would push the threshold higher at each failure to correctly predict the network utilization.

An alternative approach makes scheduling decisions on the mobile device rather than the scheduling or coordinated server, referred to as uncoordinated scheduling. Some support from the network is provided to inform the mobile devices of the current network load. As with the other cases, the mobile device fulfills any requests that are still pending when their deadline is reached. Otherwise, it attempts to spread downloads as evenly as possible between uncongested time slots. Using the per-user forecasted utilization values, a safe threshold is determined by finding a percentile, e.g., a $75^{th}$ percentile, value of the forecasted utilization values. This threshold is capped, e.g., at about 80% utilization to leave a buffer, referred to as a safe threshold. If utilization is currently below the safe threshold then an amount of data is downloaded such that the data will be evenly spread between safe times. A schedule is recomputed each time slot as well, as new data about eNB utilization is received.

Figure 14:
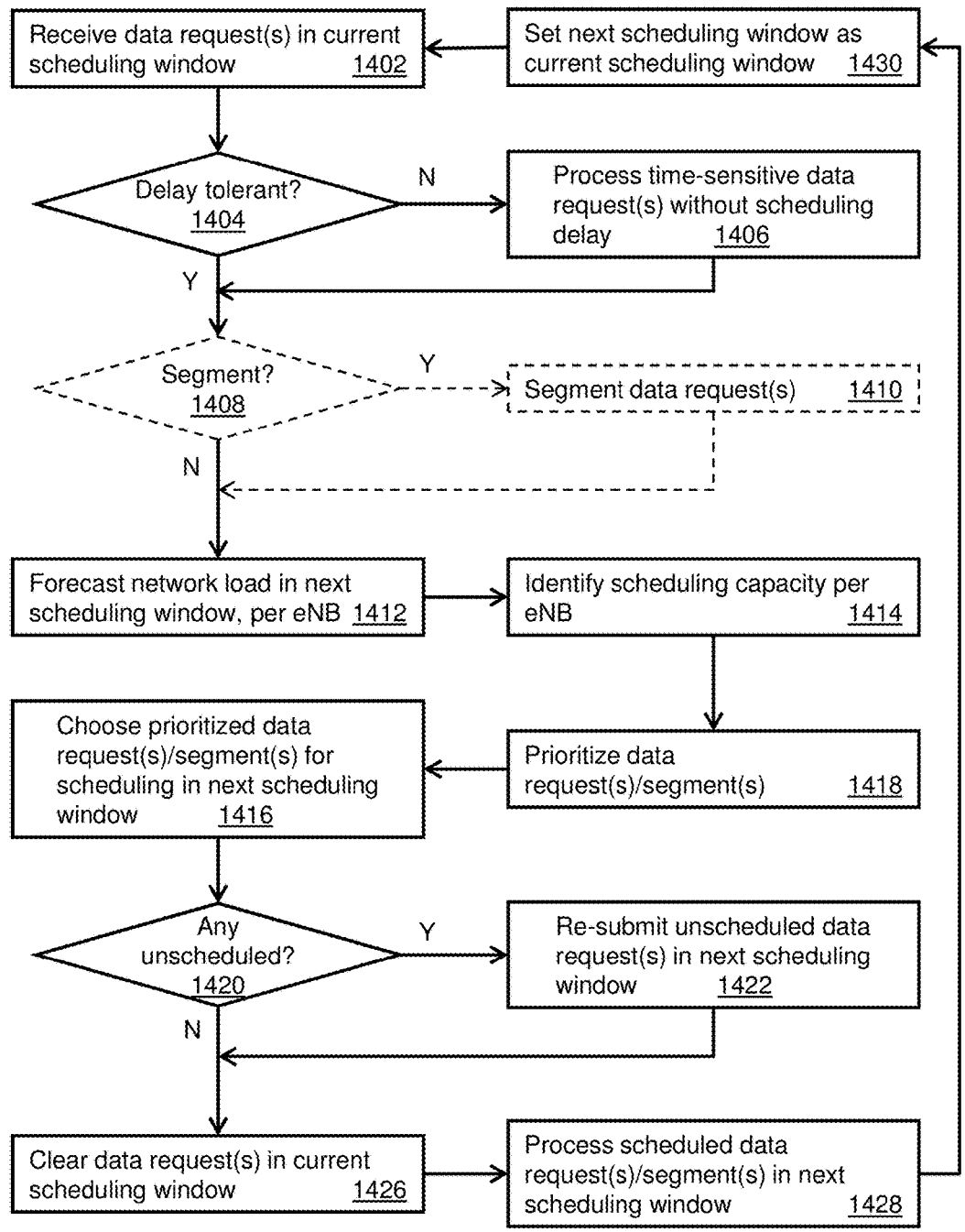
FIG. 14 depicts a depict an illustrative embodiment of a process used in portions of the system described in FIGS. 1-4A, 4B, 8 and 12.

FIG. 14 depicts a depict an illustrative embodiment of a process 1400 used in portions of the system described in FIGS. 1-4A, 4B, 8 and 12. According to the process 1400, a data transfer request is received at 1402 within a current scheduling window. In general, a timeline can be partitioned or otherwise divided into a number of sequential scheduling windows, intervals or slots. A determination is made at 1404 as to whether the data transfer request is delay tolerant. The determination can include identifying the data transfer request as time-sensitive or not. To the extent the request is not delay tolerant, i.e., time-sensitive, the request is processed at 1406.

The data request relates to a particular quantity of data or bytes. In some embodiments, a determination is made at 1408 as to whether the data request should be segmented or otherwise broken down into a number of related request for smaller quantities or portions of data. For example, a data request for a multimedia clip, such as a feature length movie or movie clip can be segmented at 1410 into a number of data requests for contiguous segments of data that collectively provide the requested multimedia clip.

A network load is forecast or otherwise predicted at 1412. The forecast can be performed on a per-eNB basis for the eNB in communication with the requesting mobile device during the current scheduling window. The forecast can be for a current and/or subsequent scheduling window. A capacity of the eNB can be determined at 1410. The capacity can be determined according to a full utilization, e.g., according to a maximum design load, busy hour, and so on. In at least some embodiments, the capacity is determined as a difference between a utilization threshold and traffic during the applicable scheduling window.

The utilization threshold can be determined according to various techniques. In at least one embodiment, the utilization threshold is determined as a maximum average traffic determined over a historic interval. The historical interval can be a time period, such as a maximum during a preceding day, a maximum day over a preceding time interval, such as a week, a month, year, and so on. The utilization threshold can be tailored according to a schedule, e.g., a maximum historical value within a limited window, such as mid-day, evening, and so on. Although data loading might be consistently lower during some period of a day, such as during the evening or overnight, it may not be desirable in at least some instances to tailor the threshold to reflect such historical trends. Indeed, it is generally desirable to increase the load in the evening in order to decrease the load at midday.

It is understood that the data request can be received along with other data requests form the same and/or different mobile devices. To the extent that multiple data transfer requests are being scheduled, the requests can be prioritized at 1418. One or more of the prioritized data transfer requests can be selected at 1416 for scheduling in a current or a subsequent scheduling window, e.g., the next scheduling window. In at least some embodiments, as many of the prioritized data requests are selected as can be serviced during the applicable scheduling window based on the capacity of the eNB.

A determination can be made at 1420 as to whether any of the prioritized data transfer requests remain unscheduled, e.g., because there was insufficient capacity during the applicable scheduling window. To the extent there were unscheduled data requests, the same requests, or new request for the same data can be re-submitted, e.g., as new requests during a subsequent scheduling window. Once all of the data transfer requests have been scheduled or re-submitted, the data requests of the current scheduling window can be cleared at 1426. The scheduled data transfer requests are processed in the applicable scheduling window at 1428. The process 1400 progresses to the next subsequent scheduling window and repeats from 1402.

Figure 15:
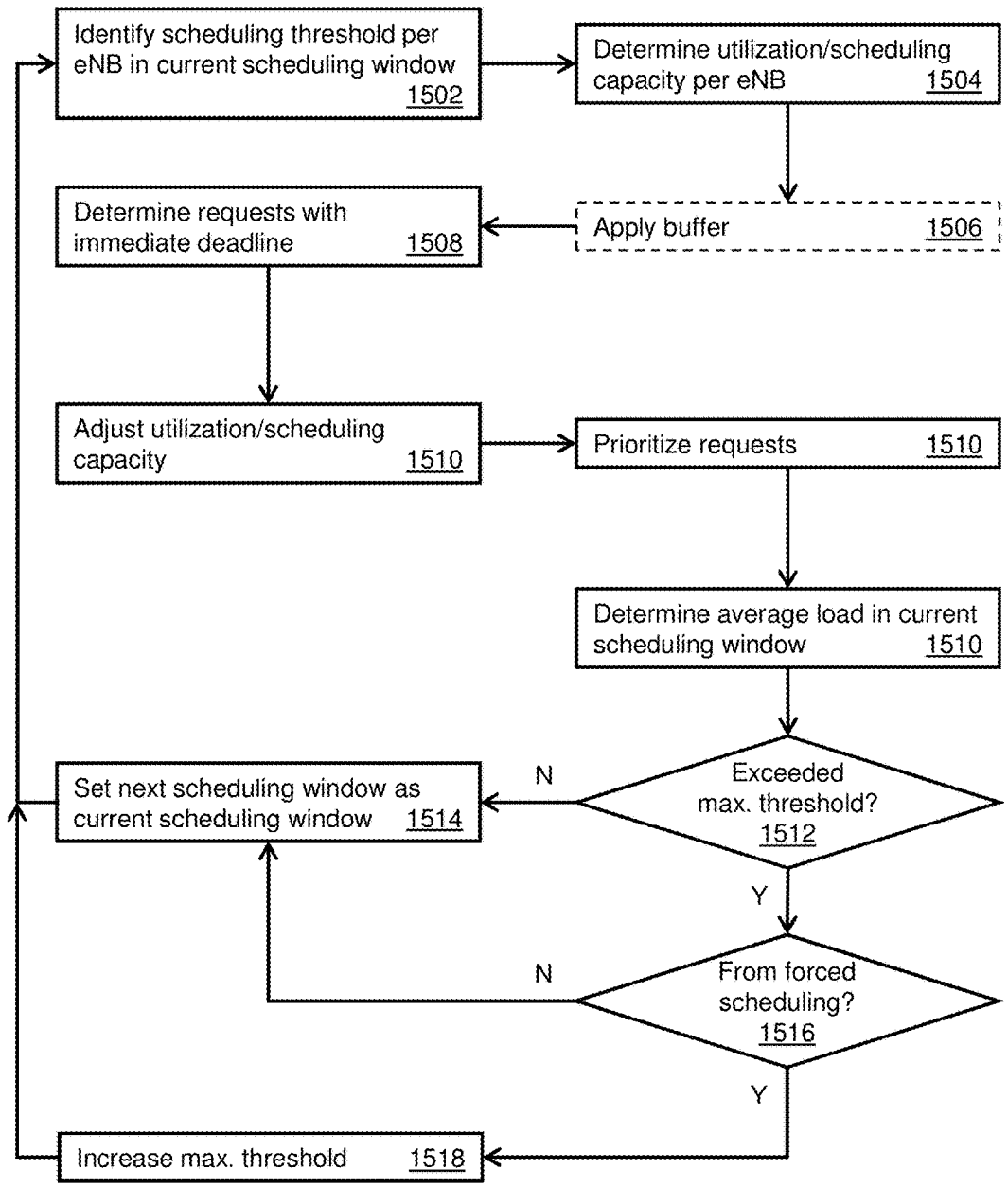
FIG. 15 depicts a depict another illustrative embodiment of a process used in portions of the system described in FIGS. 1-4A, 4B, 8 and 12.

FIG. 15 depicts another illustrative embodiment of a process 1500 used in portions of the system described in FIGS. 1-4A, 4B, 8 and 12. A scheduling threshold per eNB is determined in a current scheduling window at 1502. A determination of scheduling capacity, e.g., based on current and/or prior utilization is determined per eNB at 1504. In some embodiments, a buffer can be applied to the scheduling capacity at 1506.

Data transfer requests are identified at 1508 having an immediate deadline, e.g., within the current and/or next scheduling window. The scheduling capacity determined at 1504 can be adjusted at 1510 according to the data transfer request having a deadline about to expire. Namely, it can be presumed that those data transfer requests will be performed at the eNB during the associated scheduling window.

The remaining data transfer requests still pending can be prioritized at 1510. An average traffic load within the scheduling window at each eNB is determined at 1510. A determination can be made at 1512 as to whether any of the prioritized requests would exceed the maximum threshold. To the extent that none, e.g., in the aggregate, exceed the threshold, they can be processed in the current scheduling window and the process 1500 can proceed to the next scheduling window by setting the next scheduling window as the current scheduling window at 1514 and proceeding with the process from step 1502.

To the extent that any of the prioritized requests do exceed the maximum threshold at 1512, a determination is made at 1516 as to whether the requests result from a forced scheduling. To the extent that they do, the maximum threshold can be increased accordingly. Otherwise, the process 1500 proceeds from 1514, setting the next scheduling window as the current scheduling window, and to step 1502.

Network trends are forecast for at least two reasons. First, per-eNodeB load forecasts can be used to schedule requests while accounting for data transfers that are not being managed according to a time-shift technique. Per-user load forecasts (e.g., the load at each eNodeB the user will visit) are obtained to incentivize users and applications to time-shift data, determine what to time-shift, and/or set time-shifting deadlines.

To forecast network utilization trends on a per-eNodeB basis a smoothing algorithm can be applied. By way of example, such smoothing algorithms can include exponential smoothing techniques, such as the Holt-Winters algorithm, an exponential smoothing algorithm that accounts for periodic trends. In an illustrative example, the period is set to one day, and the algorithm is slightly modified by eliminating a linear trend term, which leads to an overfitting. Different sets of parameters can be used for different forecast windows. For example, short-term forecasts can benefit from accounting for short-term trends, whereas long-term predictions can be based primarily on what has been seen in previous days.

Table 1 includes an example of a modified Holt-Winters algorithm without the β (linear trend) term. A different set of parameters is provided for each time range (in some instances, the parameters used for intervals of two hours or more are the same).

TABLE 1

Modified holt-winters algorithm.

m ← 0
b ← 0
intervalsPerDay ← 4 × 24
function ADDDATAPOINT(y; t)
    if t < dayLength then
        c[t] y
        Continue
    end if
    m ← α × (y − c [t − intervalsP erDay] )+(1 − α) × m
    c[t] ← γ × y + (1 − γ) * c [t − intervalsPerDay]

TABLE 1-continued

Modified holt-winters algorithm.

end function
function GETFORECAST(l; t)
    return m + c [t − intervalsPerDay + l]
end function For per-user load predictions, user location traces and eNodeB load traces can be merged, with future load experienced by each user predicted from this new per-user load trace. The same modified Holt-Winters algorithm can be used when predicting per-eNodeB loads, e.g., with different parameters.

In another approach eNodeB predictions can be merged with predictions of user locations. However, predicting which eNodeB a user will connect to in the future is challenging. It has been observed that users often connect to different nearby eNodeBs from day to day, despite presumably working and living in the same location. It has also been observed that these users still experience similar loads from day to day. For instance, if a user falls between a few eNodeBs while at work and connects to different eNodeBs from day to day, those eNodeBs may exhibit similar loads as they serve similar sets of users. As a result, creating location-agnostic per-user load traces and forecasting based on those can be an effective approach.

Figure 16:
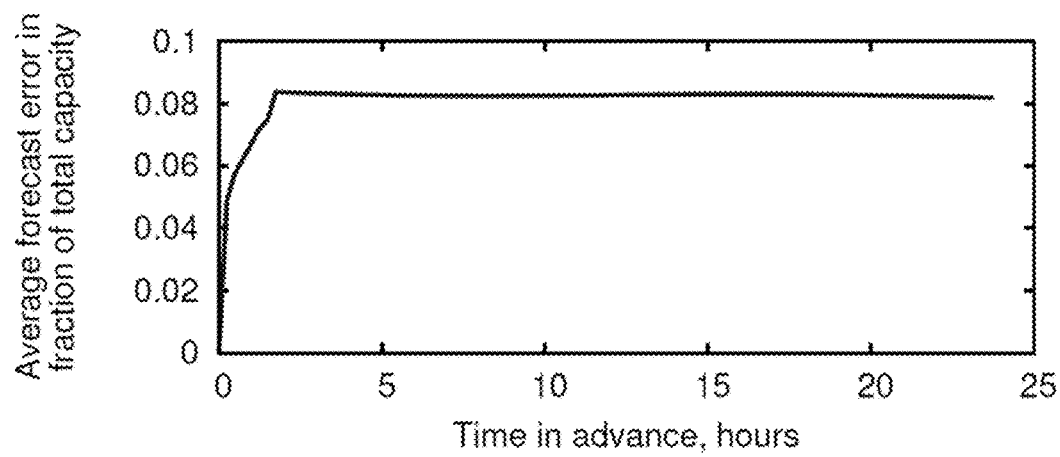
FIG. 16 depicts a graphical representation of an example an impact of time intervals on forecast accuracy.

The graph 1600 illustration of FIG. 16, demonstrates how accuracy varies with a forecast time range for per-user traces. The observed accuracy is within about 0.08 total network load in most cases. Note that predictions become much more accurate two hours in advance, a fact that informs the scheduling approach. For this reason, in per-eNodeB forecasts that are used for scheduling data, a focus is on predicting network load one time interval in advance (e.g., set to 15 minutes, due to a granularity of a sample dataset). The median error of these per-NodeB predictions is 0.02, although 10% of the time the error is over 0.1.

To develop these parameters, trends in a major US city were examined using a dataset covering the first few months of 2014. Network load was measured by the fraction of available Physical Resource Blocks (PRBs) that are used at each eNodeB. PRBs can be mapped to the amount of available bandwidth per user, given the user's signal quality. In the example dataset, average PRB utilization over 15 minute time intervals have been collected for each eNodeB.

Figure 17:
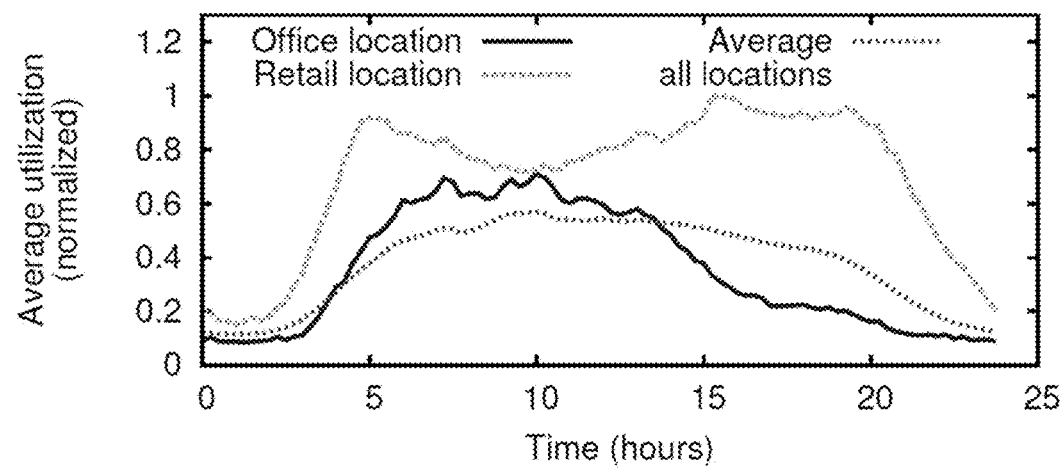
FIG. 17 depicts a graphical representation of an example of diurnal trends of a mobile cellular network.

General trends in network load were examined in more depth, which informed and motivated the example scheduling strategies disclosed herein. Although ENodeBs exhibit daily diurnal patterns, individual eNodeBs exhibit different trends from each other. A graph 1700 of FIG. 17 shows two examples of the average load patterns experienced by two eNodeBs over the course of a day, as well as the average across all eNodeBs. The eNodeB covering an office area peaks earlier than average and is less heavily loaded in the late afternoon. An adjacent eNodeB in a retail area has two distinct peaks and a lull in the middle of the day. These load variations demonstrate examples of predictable usage patterns around which data can be scheduled.

Figure 18:
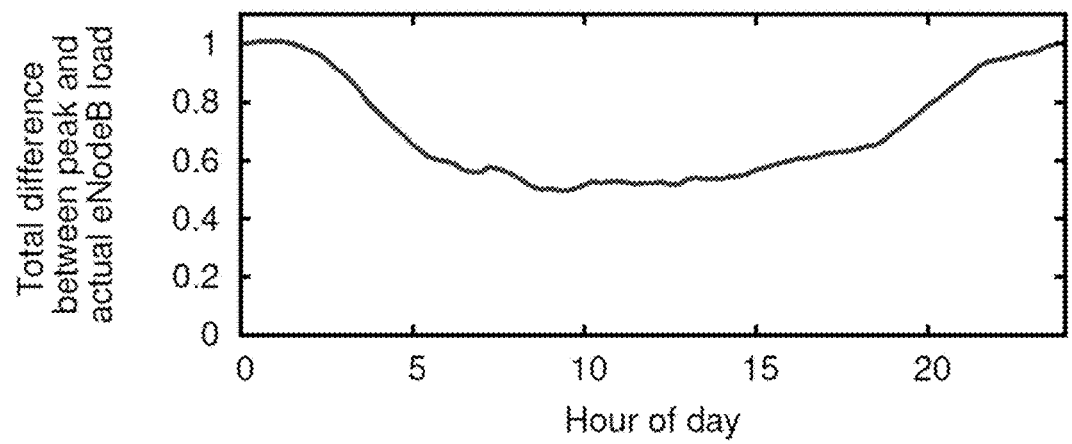
FIG. 18 depicts a graphical representation of an example of differences between peak and actual base station loads.

It is apparent from FIG. 17 that network usage is lower at night. However, simply shifting all network traffic to occur at night is insufficient. There are likely cases where applications or users have some constraints on when data should be downloaded. For instance, when prefetching, data must have been generated before it can be pre-fetched, and when delaying data, users may be unwilling to wait until the middle of the night to consume content. Furthermore, a graph 1800 of FIG. 18 illustrates that there is a substantial amount of underutilized capacity during daytime hours. The average difference between an eNodeB's maximum network load and its current load was examined by time of day. Even in the middle of the day, the amount of unused capacity was found to be more than half that during the middle of the night. By only making use of free capacity at night, available capacity during the daytime is wasted.

Figure 19:
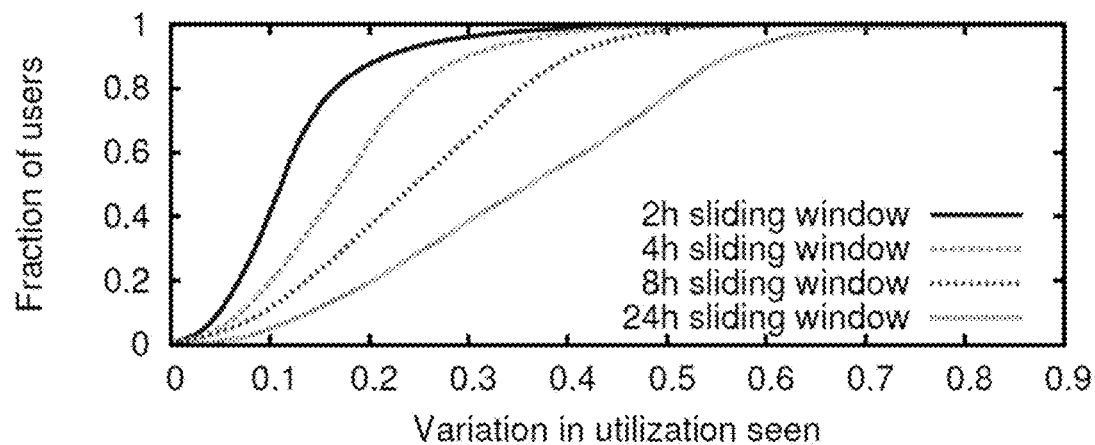
FIG. 19 depicts a graphical representation of an example of average variation in network load over different sliding windows.

Furthermore, a graph 1900 of FIG. 19 illustrates that there are substantial variations in network load for even short time-shift windows by examining variations during sliding windows of various lengths. During time windows as short as 2 hours median load were observed with variations of 12% of network capacity on average, versus 33% with a 24 hour time window. Forecasting variations over these smaller time scales is important to allow for the scheduling of data with tighter deadlines, as well as to allow for a more efficient use the network during peak hours.

An In-Network Coordination Server (INS) can leverage predictions to effectively schedule data. First, time is divided into scheduling intervals, corresponding to a frequency with which devices synchronize with the INS. The INS then determines how much data can safely be scheduled over the next time interval without increasing network load. Given this constraint, data can be scheduled using a scheduling algorithm. One such algorithm implements a work-conserving, earliest-deadline-first approach, which allows for an effective scheduling of data with incomplete or inaccurate long-term utilization predictions.

In a first step an amount of available capacity is determined. The INS keeps track of a target threshold for each eNodeB, which can be equal to a peak utilization that the eNodeB has seen so far. In some embodiments, the approach errs on the side of under-scheduling data to avoid increasing peak utilization. That is scheduling is slightly under a target threshold to account for occasional errors in forecasting network load, which are unavoidable in any prediction algorithm.

In some embodiments, to take advantage of the fact that network load forecasts become more accurate the closer to the target time, the INS schedules requests no farther than one scheduling interval in advance. When choosing what requests to schedule, first, any requests that are about to reach their deadline can be fulfilled regardless of network capacity. If any free capacity remains, the more data can be scheduled. Requests can be scheduled to fill the available capacity below the target threshold (e.g., using a work-conserving approach), with requests fulfilled starting with the earliest deadline. In order to avoid increasing the eNodeB's peak load by staying below the target threshold, as much data as possible is downloaded "now" without exceeding a target load is always a better decision than delaying downloads until later. If loads later are higher than expected, scheduling more data now avoids overscheduling downloads later. Conversely, if they are lower, then nothing is lost, since the eNodeB's peak load has not been increased.

If the target threshold was exceeded by data at the deadline, the target threshold can be increased to that level, as data must have been scheduled too conservatively in the past for this to happen. Thus, over time an ideal target threshold is obtained incorporating both time-shift-controlled loads and other loads. The threshold is not increased if the target threshold was exceeded due to a mis-prediction. Such a periodic scheduling approach allows decisions to be made time-shifting globally. It allows for leveraging more accurate, up-to-date forecasts while allowing devices to only periodically connect to the INS, allowing for a beneficial tradeoff between scheduling accuracy and device overhead.

By way of non-limiting example, a number of alternative design approaches against were compare the aforementioned time shifting approach to better understand the impact of the tradeoffs made.

In a first alternative design approach, referred to as a fixed download time, an alternate scenario was evaluate din which user scheduling decisions were made once, rather than recalculated each scheduling interval. Upon submitting a request to time-shift data, the system calculates the expected best time to fulfill the download (e.g., the time with the most available capacity). The volume of existing requests submitted to each eNodeB was also accounted for when determining this optimal time.

In another alternative approach, referred to as inter-device coordination scheduling decisions are made on the device, e.g., a mobile phone, rather than the INS. As with the other cases, the device fulfills any requests that are still pending when their deadline is reached. Otherwise, it attempts to spread downloads as evenly as possible between underutilized time slots, with no knowledge of load from other devices. This schedule was recomputed in each time slot when new data about eNodeB utilization is received. Some support from the network is still needed to inform devices of the current network load.

In yet another alternative, everything is downloaded at night. This simple approach can be effective if it were always practical, as network loads at night are lower than during the day. However, users delaying content might be unwilling to wait to consume the content until a time when they would normally be asleep; conversely, content that is pre-fetched automatically by the application (such as the daily news) may not have been generated during the middle of the night.

Another alternative relies on constant communication. This approach is impractical due to the data and battery overhead of constantly sending network load updates all day, even when the device is not actively scheduling data.

Overhead of the design approach was evaluated by developing and benchmarking a prototype system, focusing on evaluating the scalability of server-side coordination and the power and data overhead on clients to demonstrate that the approach is practical for real-world, nation-scale cellular networks. Herein below, making use of trace-based analysis is disclosed to demonstrate the impact of an example time-shift system at the scale of a real cellular network.

The prototype was used to evaluate two sources of overhead: one set of experiments measured the power and data overhead on a real mobile device, and one evaluated the scalability of in-network coordination by submitting and processing a large number of API requests at the INS. The overhead of INS computation was not an issue at all due to algorithm design, but the battery overhead of server-client coordination needs to be considered.

The mobile device component was developed for Android mobile operating system in the form of an app. The app periodically generates requests to download files of various sizes from a web server set up for this purpose, with various deadlines. In addition to waking up to generate and accept these requests, the time-shift app set a periodic timer to wake up and send the size and deadline of each pending request to the INS. The INS then replied with a list of requests to fulfill before the next synchronization. The application also fetched and displayed network load forecasts from the INS, which are used to incentivize time-shifting.

The INS server was implemented in the CherryPy object-oriented web application frame work that was not necessarily optimized for performance. Communication between the INS and client was done using a simple JavaScript Object Notation (JSON) API over HTTP. The INS made use of a trace of eNodeB loads, and each scheduling interval, the INS woke up, fetched the load from the trace corresponding to the last time interval, and used it to update the forecast model and estimate the load over the next time interval. It would store any requests received, order them by their deadlines, and determine a list of requests to be fulfilled in the next interval. When a device next syncs with the INS, it pushes to the device the requests to fulfill. In addition to using the INS to test the client application, another server generated network requests to simulate hundreds of user devices to stress-test the INS.

The power and data overhead on the device were examined first. To examine the impact of time-shift's network communication in isolation, parameters were generated for a standard model of LTE power consumption using a power monitor, and then calculated the impact of the TCP flows sent using tcpdump traces collected on the test phone. This model accounts for the impact of cellular RRC state transition dynamics, which have a significant impact when sending small amounts of data, and allows us to separately examine each component of network communication.

The results are summarized in Table 2. These values correspond to a power overhead of about 1.8% per day on a Samsung Galaxy S4 in total. Since only a small amount of data is sent, the RRC tail timers have a large impact on power consumption, and so if there is other traffic on the device, the actual added power consumption due to time-shifting would be far lower. Power consumption could be greatly reduced if fast dormancy were enabled. Nevertheless, this overhead motivates the need for time-shifting to support intermittent, rather than continuous, server synchronization. Note that these values may vary slightly by cellular ISP, as different providers have different RRC tail timers.

TABLE 2

Prototype overhead metrics for a Samsung S4 device, which has pending requests to send over the entire course of a day and uses 15 minute scheduling intervals. Data sent includes all bytes sent over the link for corresponding flows including all headers.

| Metric | Result/active interval | Result/day (constant requests) |
|---|---|---|
| Energy consumed due to server communication | 6.4 J | 614 J (1.7% battery capacity) |
| . . . due to forecasts | 4.4 J | 422 J (1.2% battery capacity) |
| . . . both (tail timers overlap) | 6.7 J | 644 J (1.8% battery capacity) |
| Extra signaling overhead-forecasts | 5.7 kB | 547 KB |
| Extra signaling overhead-coordination | 5.4 kB | 516 KB |

Each coordination with the INS consumes about 5.4 kilobytes of data. Headers make up the majority of the data consumed, but a more efficient protocol than HTTP could reduce the data consumed further.

The INS scheduling overhead was also measured. Computation time was not an issue. An artificial workload of data for 10,000 users, far more than eNodeBs can support today, takes less than a millisecond to schedule. This is not surprising, as due to the number of users to schedule, the algorithms were designed to run in linear time. Having a separate server run 1500 simulated users that sent requests to the INS was also tested. The communication interval was increased to five minutes for ease of testing, and had all simulated users submit requests almost simultaneously, but the additional overhead from adding new users never exceeded tens of milliseconds. The overhead of storing and scheduling requests was under half a megabyte, but 24 megabytes were needed to store forecasts for 1500 users.

An objective of time-shift is to alter how network loads are distributed over the entire cellular network, to use network resources more efficiently and to flatten network usage peaks. Therefore, to understand the impact of time-shift on cellular network loads as a whole, time-shift must be evaluated on a realistic scale. To do so, a PRB utilization dataset similar to the one used to develop the aforementioned forecast algorithm was used, collected in the first week of June 2014. A region encompassing over one hundred eNodeBs and hundreds of thousands of users was selected, covering both the downtown core and suburban areas of a major city. Note that, while evaluations were accomplished at the scale of a city to bound the scale of the simulations, a time-shift deployment can add, e.g., parallelize each component of the analysis by user or by eNodeB, allowing it to scale indefinitely.

This dataset was merged with a set of anonymized user to eNodeB associations. The privacy of the users was preserved as all user identifiers in the dataset were anonymized prior to the analysis and focus was on the aggregate statistics across all the users in the data sets. The data set of eNodeB to user associations contains an entry every time the user interacts with the network, such as when sending or receiving data or connecting to a new eNodeB. Where a small gap exists in the data, it can be assumed that the user is stationary during that time and connected to the same eNodeB. Users may also travel outside of the target area. In order to confine the analysis to a fixed area to bound the scope of the simulations, downloads were not scheduled for users who will be outside of the target area for an hour or more, and users who spent less than five hours in the target area were excluded. If the user is only outside briefly, all downloads can be delayed until they return. These are limitations of the simulation, not of the time-shift approach as a whole.

The user dataset also contained RSRQ (Reference Signal Received Quality) values for each user, which allows for an estimation of the bit rate achieved over the radio interface in order to determine the PRB utilization a given user would need for a given workload. In cases where RSRQ records are missing, the lowest value (supporting the lowest bit rate) can be taken to make the most conservative possible claim about how much data can be time-shifted.

Since the data on eNodeB loads consists of PRB utilization data and not network traces, information about the data type that is being requested is not available to support a determination as to what fraction of the data is time-shiftable. To overcome this, it was assumed that the data in the traces is time-sensitive, and generate additional, random loads during daytime hours, examining a variety of load patterns.

A default data load and scheduling configuration was examined first, and then compare against alternate network loads and deadlines. For this experiment (and all subsequent experiments), data is scheduled at 15 minute intervals due to the PRB load dataset averaging values over these time windows. In the simulation, each individual user was submitting requests to an eNodeB-specific server every 15 minutes. Each eNodeB then estimates the load in the next time interval and schedules data accordingly, with no inter-eNodeB coordination. What the actual load resulting from that schedule would have been was calculated given the real network load during that time interval, in order to evaluate the scheduling algorithm.

Figure 20:
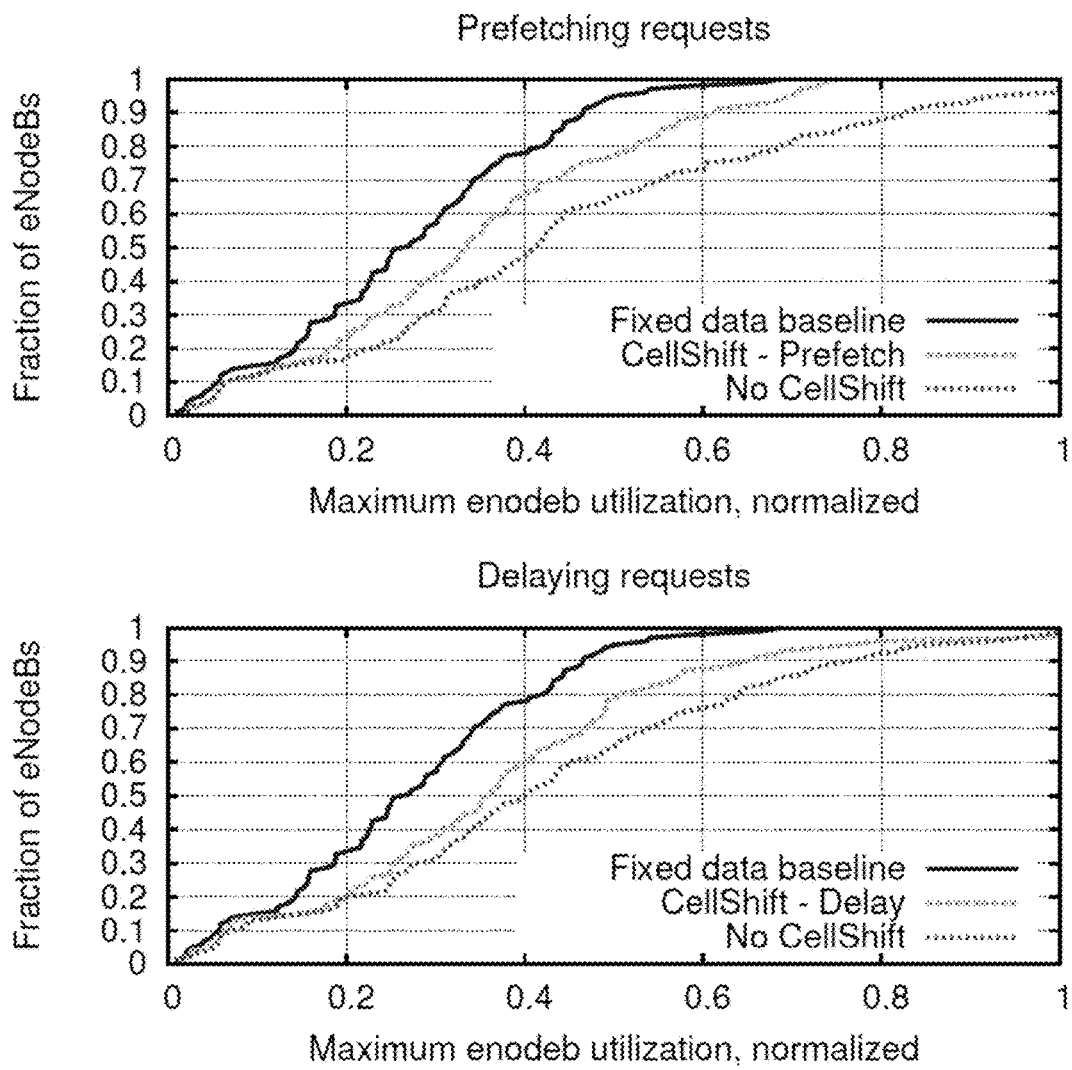
FIG. 20 depicts graphical representations of examples of base station performance responsive to delaying or prefetching traffic with fixed deadlines.

For this default load, a randomly selected subset of users download five large files at randomly selected times during the daytime, resulting in a 40% total increase in PRB utilization across all eNodeBs. The results of this scheduling are shown in the graphical results 2200 of FIG. 20 with the deadline set to 8 hours, examining both the case where the randomly selected data load is delayed and where it is pre-fetched. Both were compared against the case where the load isn't time-shifted, representing the case where there is no time shifter to schedule data, and against the case where the additional time-shift-controlled load is ignored entirely, representing a lower bound on how much time-shifting can achieve. There are slightly different loads when delaying and prefetching data, since to fairly evaluate time-shifting effectiveness, requests were not scheduled where users would leave the analyzed area before the time-shift could complete.

When prefetching, time-shifting is able to reduce the average impact of added load on per-eNodeB maximum utilization by 52%. Without time-shifting, the ratio of added overhead to percent added data is 1.4, and with time-shifting it was reduce to about 0.6, a significant improvement in how efficiently data was scheduled. When delaying data the ratio of percent added overhead to percent added data was reduced to about 0.97 and the impact of the added data on peak load was reduced by about 24%.

Figure 21:
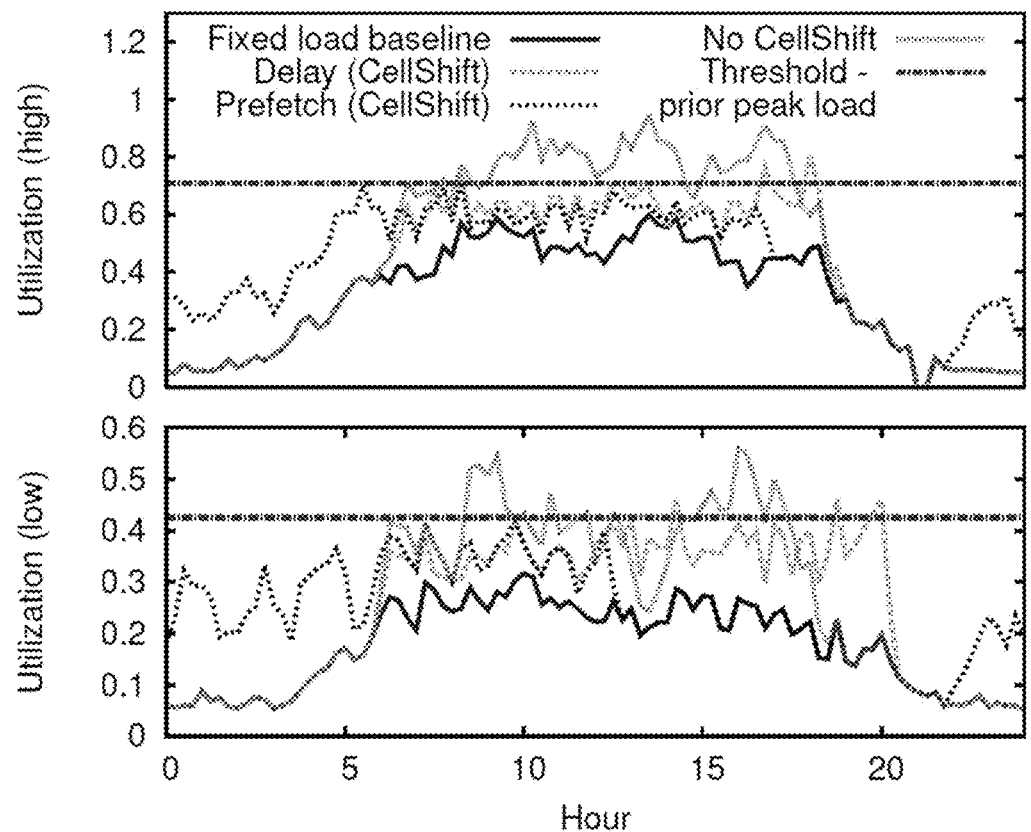
FIG. 21 depicts graphical representations of example base station time-shifting traces.

Example traces from two eNodeBs are illustrated in the graphs 2100 of FIG. 21 to provide an example of how data is time shifted. The top trace is in a moderately busy area (high utilization), whereas the second one has a lighter load (low utilization). In both cases, days were observed with heavier loads, so there is room to schedule data without increasing the target threshold. It is possible to avoid exceeding the target threshold in most cases by scheduling data conservatively, multiplying the expected free capacity by a fraction, e.g., about 0.8. When prefetching data, a benefit can be obtained from being able to shift data to off-peak hours, but when delaying data, in these two cases much of the data is downloaded during the day. In the heavily-loaded case advantage was taken of the slight valley around noon and after 3 pm. For both eNodeBs, but especially the lighter loaded eNodeB, advantage was taken of the fact that peak load was not reached for this eNodeB this day and allowing free capacity to work with. For the heavier loaded eNodeB, there is less load on the eNodeB overall as the load was also shifted away from this eNodeB where possible. For situations in which predictions are not entirely accurate, the eNodeB's peak load can be increase slightly. Overall the peak-to-average ratio of the daytime load pattern was flattened significantly by distributing data between eNodeBs to meet scheduling goals.

For comparison, a number of alternate system designs were examined with different tradeoffs. The first was one in which the INS calculates a single, optimal download time when a request is first issued, between four and eight hours in the future. No further coordination is needed, allowing the device to sleep entirely until the scheduled time. This reduces the overhead of a single request in isolation by 32 times with an eight hour deadline and 15 minute coordination intervals (less in practice if multiple requests are scheduled or data is downloaded before the deadline).

For this alternate design, it was assumed that a user location can be predicted with some degree of accuracy. User location has been shown to be predictable to a degree in prior work, especially at home and at work. To schedule this data, the INS calculates the optimal time to schedule data based both on predictions of network load at each eNodeB the user is expected to visit, as well as prior requests made to each eNodeB at each time. Each eNodeB keeps track of requests made to date. Once data is scheduled at the eNodeB, that request is treated as fixed. As data is being scheduled in advance and the global load is being monitored on each eNodeB, a load can be determined such that the network can safely support and only schedule that data, to avoid the network becoming overloaded.

Figure 22:
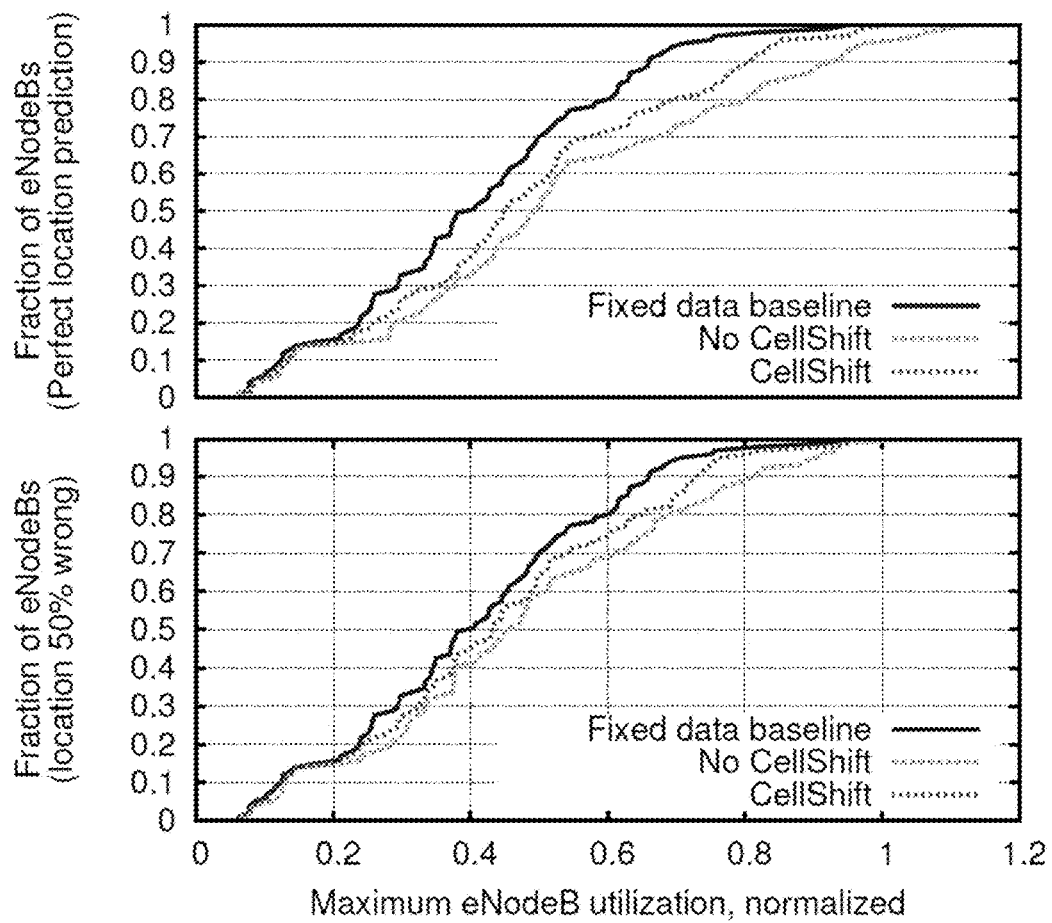
FIG. 22 depicts a graphical representation of an example of base station performance responsive to delaying traffic to a proposed, fixed deadline.

Example results are shown in the graphs 2200 of FIG. 22. Considering the peak load increase to data increase ratio, it was able to be reduce from 1.5 to 0.84. The reduction is slightly lower with the alternative design supporting half as much data. Unsurprisingly, if the location prediction accuracy is reduced to 50% (randomly selecting a different eNodeB as the predicted eNodeB the rest of the time), the amount of data that can be supported while still achieving good results decreases. Note that in both cases the load on the network can be prevented from exceeding 100%—when it exceeds 100%, that indicates that an attempt to send more data than the network can support.

Figure 23:
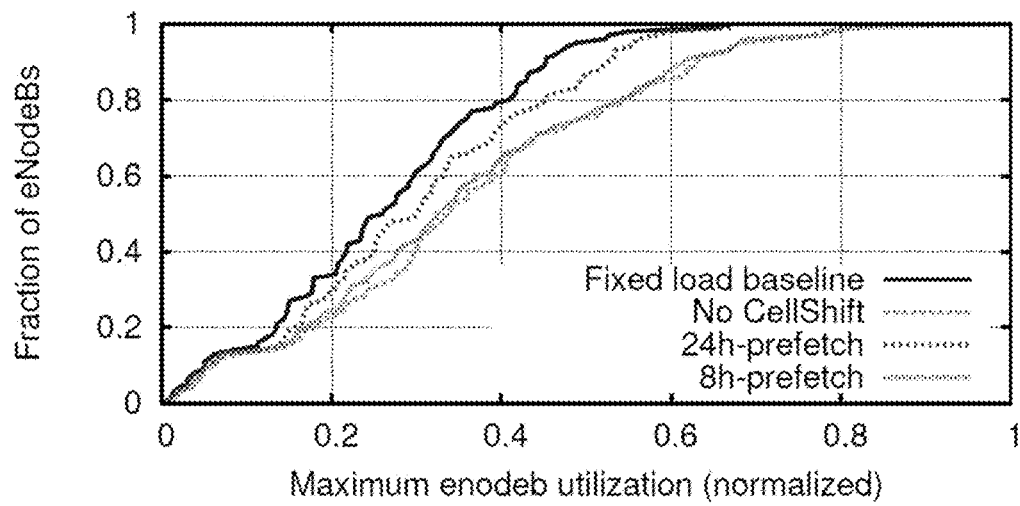
FIG. 23 depicts a graphical representation of an example effectiveness of uncoordinated scheduling of time-shifting.

The impact of removing all inter device coordination is examined, and the results 2300 shown in FIG. 23. In this scenario, devices spread load evenly among available time slots before the deadline. Having devices pick times to download at random was also examined, but for large downloads, even a small number of users randomly selecting the same time could lead to new congestion peaks. It was found that these peaks occurred often enough to negate any benefits of time-shifting. By primarily evaluating the worst-case load, random selection are not suitable, unlike in scheduling approaches that care primarily about average results. Variations in network load are small enough during the day that coordination is needed, although with a 24 hour deadline this approach can be successful. In that case, data transfers can be shifted to occur at night, where time-sensitive load is low enough that careful coordination is not needed when scheduling data. This would be impractical for many use cases, however. Note that even without coordination, devices would need network utilization data, either supplied by the carrier, or possibly inferred from signal strength metrics.

The impact of the deadlines set by users, the amount of data to schedule, the distribution of the data to download throughout the day, and an ability to schedule very heavy loads of time-shift-controlled data were also examined.

Figure 24:
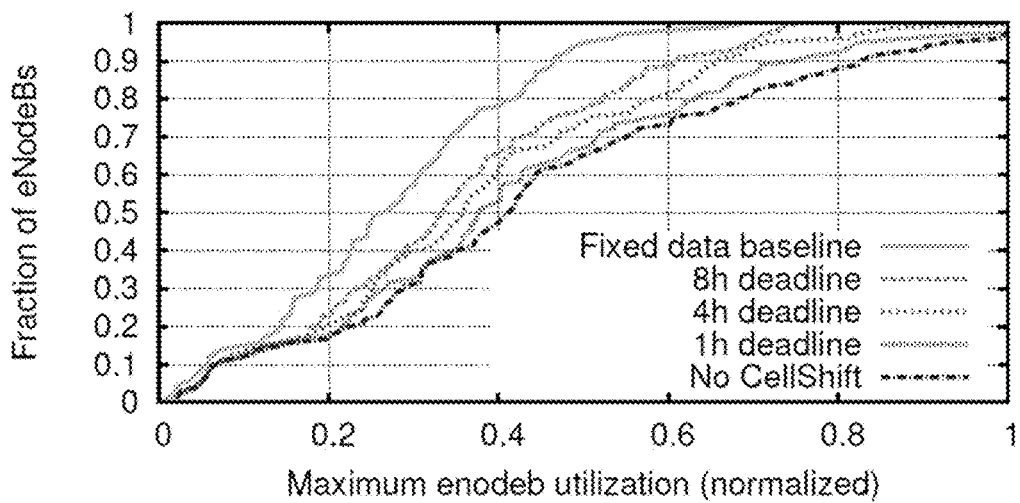
FIG. 24 depicts a graphical representation of an example impact on base station performance of deadline length on prefetching.

The effects of varying the deadline length are shown in the graphical results 2400 of FIG. 24, with deadlines of a fixed time in each case. With a four hour deadline the ratio of added peak load to added data was reduced to 0.87 and with a one hour deadline it was reduced to 1.2 (versus 1.4 with no time-shifting and 0.64 with an eight hour deadline). The benefits of time-shifting with a one hour deadline may be significantly smaller, but halving the deadline only slightly reduces the amount of data that can be time-shifted.

Figure 25A:
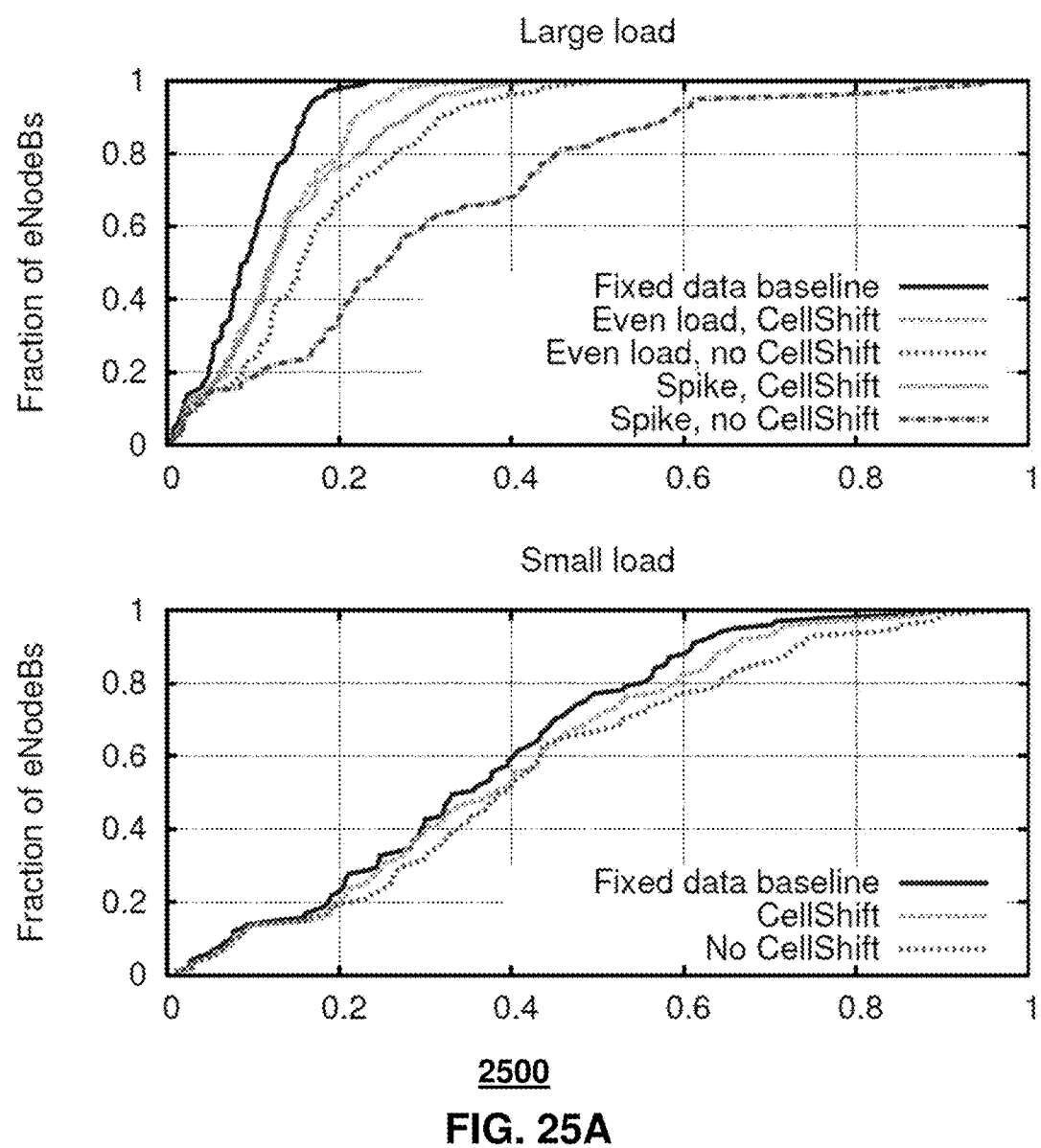
FIGS. 25A and 25B depict graphical representations of example impacts on base station performance under a variety of loads.
Figure 25B:
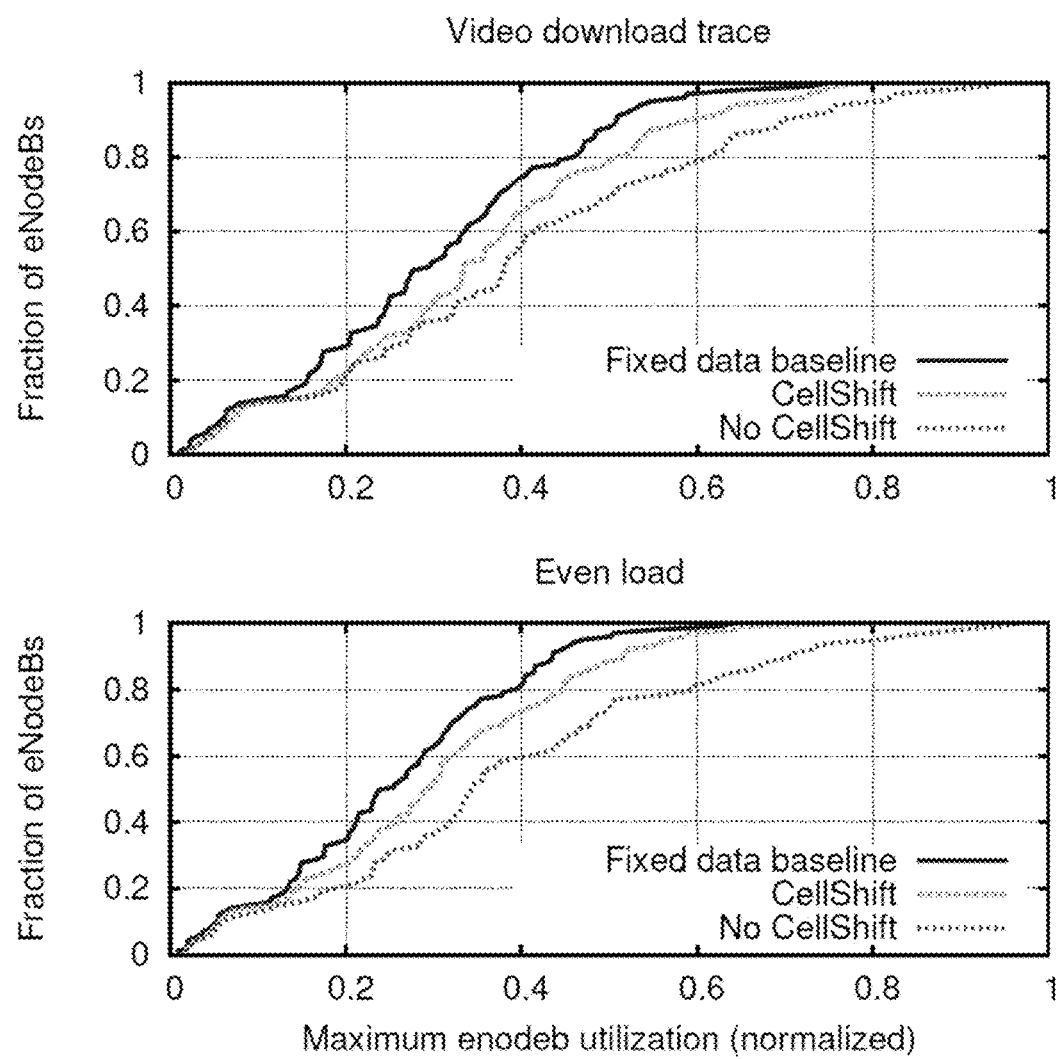

A variety of alternate network loads to schedule was also examined. In the graphs 2500 of FIG. 25A and the graphs 2550 of FIG. 25B, the impact of varying both the quantity and distribution over time of requests scheduled by time-shift were examined. First, a very large data load was examined. The same pattern of users randomly downloading large files during daytime hours was used, but the number of users was doubled, and thus the amount of data to be scheduled. The impact of this data on maximum utilization was reduced by 52% in the median case, almost the same as with the smaller load. Conversely, examining an even lighter load than an earlier example in the second part of the figure, yielded better results: the impact was reduced by 80% on average (although in absolute terms, this only translates to a 9% reduction overall). With a small enough time-shift-controlled load, it is easier to fit the data entirely in valleys between time-sensitive traffic, although with a large load, benefit are realized from substantially smoothing traffic loads.

It is understood that video traffic both contributes a large amount of data (30% of total HTTP traffic in 2011), and makes up a higher proportion of the data during off-peak hours. In this regard, a set of video traces was examined for moderately-sized videos (less than 1 GB) collected separately from the eNodeB load data, and generate a load based on those traces. There are some limitations with this dataset, particularly mapping users in the eNodeB load trace to the video load, and dealing with the fact that the control case has a high amount of load during off-peak hours. In particular, users who experience very poor signal strength during off-peak hours would saturate the connection during this time, and so could not stream the video in the case without time-shifting, making a fair comparison hard. Therefore, the available bandwidth was not reduced when users have low RSRQ values for this test. Comparable results were achieved as with other loads, although the impact on lightly-loaded eNodeBs was reduced less effectively. In this case, without time-shifting the ratio of increased peak load to added data was 0.76, which was reduce to 0.45. This ratio is low even without time-shifting because a disproportionate amount occurs during off-peak hours.

To further investigate the impact of network traffic patterns, another case with an artificial data load was examined in which download requests were constrained to occur during a limited time window. With support for time-shifting, it is possible that the pattern of time-shift-controlled data diverges from the current diurnal pattern. A case corresponding to users streaming music during their daily commute was examined, leading to a large amount of traffic during a few hours of the day only. Despite the unconventional load, a significant amount of data can nevertheless be scheduled. In relative terms, utilization was reduced much more in this case, by about 63% on average, and the ratio of added peak load to added data was reduced from about 1.8 to about 0.67.

Time-shifting can effectively smooth spikes, but even very even loads can be time-shifted. In the second half of the figure, users were randomly selected and given a constant additional load during peak hours. With an 8 hour deadline the load can still be reduced substantially, with the average case being reduced by about 71%. With a much shorter two hour deadline, however, no benefits were observed from time-shifting. When data is already evenly spread out, it is harder to spread it further when the time constraints are insufficiently flexible.

Figure 26:
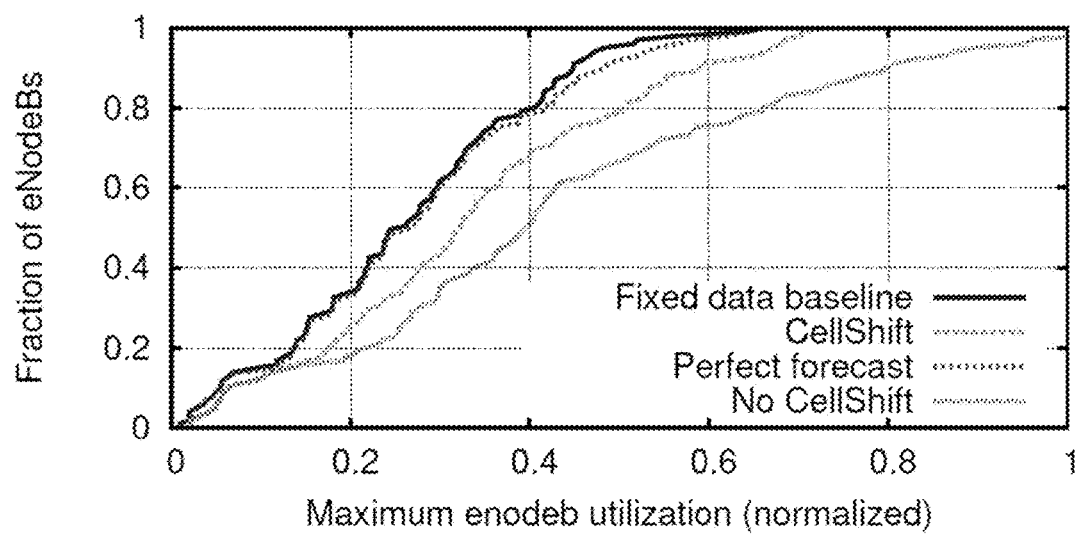
FIG. 26 depicts a graphical representation of an example impact on base station performance of various different forecasts.

Per-eNodeB forecasts are can be used to estimate the average utilization in the next time slot, but these forecasts, even 15 minutes in advance, are generally not perfect. In the graph 2600 of FIG. 26, it is shown that with perfect 15 minute forecasting the impact of time-shift-controlled data could be almost completely eliminated. This shows that results are limited by imperfect predictions, not by a particular short-term scheduling algorithm. In another approach to close this gap, requests can be tentatively scheduled in each 15 minute time slot, while actively monitoring the second-to-second eNodeB load. Devices scheduled to download data in the current time slot would then communicate with the INS at a much higher rate to determine more precisely how much data can be sent, although the energy cost of doing so could be substantial, e.g., possibly fifty times higher. A similar approach can be taken for short-term prefetching, to smooth a fixed amount of data within a TCP flow, rather than to determine how much data to download during a given time period, so the power overhead of this coordination is expected to be less of an issue as there is already active network traffic.

Figure 27:
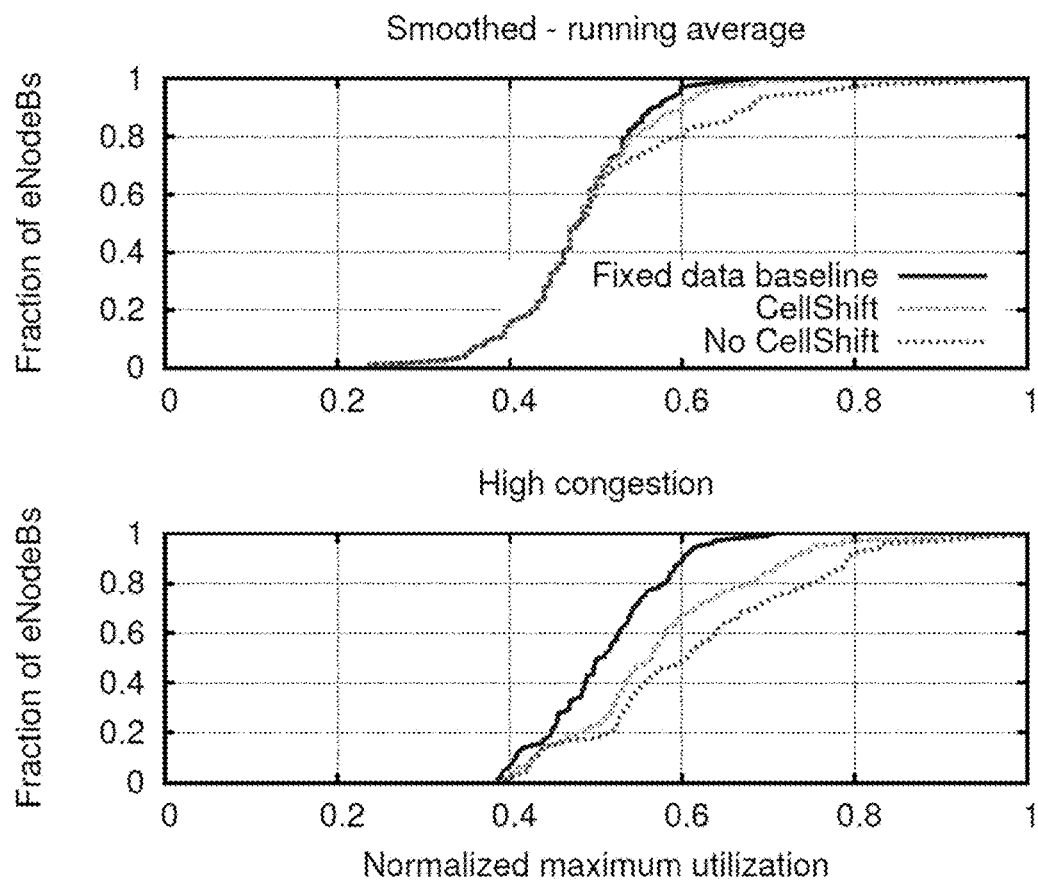
FIG. 27 depicts graphical representations of example impacts on base station performance handling challenging time-sensitive data loads.

The aforementioned results have been based on network traces from a major cellular network. Whether time-shifting would work in networks where the total load, not just the data to schedule, has different characteristics was also examined and is discussed herein below. In particular, the examination is directed towards more congested or poorly provisioned networks, and networks with less variation in load over time. Two such hypothetical patterns in the graphs 2700 of FIG. 27 were examined: one in which the network load was increased greatly, and another in which the baseline utilization was smoothed by taking the average value over the last hour for each scheduling interval.

First, the results are dependent on leveraging variations over time and between eNodeBs, but the smoother fixed data load actually performs better. It appears that although smoother load patterns offer fewer time-shifting opportunities, smoothing the data makes the peaks and valleys more predictable, and thus less likely to inadvertently schedule too much data during a data spike. With time-shifting, the impact of this added data can be almost completely eliminated, reducing it by about 86% on average. Because this smoothing reduces any utilization spikes in the baseline data, even without time-shifting, the time-shift-controlled data has a lower impact on each eNodeB's maximum utilization.

In the congested case, time-shifting effectively is more challenging, and the impact of time-shift-controlled traffic was only reduced by about 35% on average. With artificially raised congestion, utilization spikes are also raised, and thus the impact of mis-predicting the next 15 minutes becomes more substantial. When a network is already overloaded, there are fewer opportunities to time-shift the data.

The results obtained in the example analyses disclosed herein demonstrate that time-shifting to reduce cellular congestion can be effective in a wide range of circumstances, including with various network utilization patterns (both time-sensitive and time-shift-controlled) and with various constraints placed on the time-shift window by applications or users. In addition, it is possible to overcome the systems challenges in designing an energy and data-efficient system to coordinate downloads between mobile devices over a period of hours.

While the results obtained by the example analyses are successful with a wide range of time-shift-controlled data patterns, some patterns can work better than others. For example, time-shifting can dramatically reduce the load on the network caused by large, bursty downloads, especially during peak hours. For embodiments in which different types of loads are analyzed and ordered according to a priority, these types of loads can be assigned a relatively high priority to adapt to use a time-shifting API. The underlying time-sensitive network traffic load also plays a role: the benefits of time-shifting are smaller when all eNodeBs are congested. If the network is under-provisioned even just for the time-sensitive data, then time shifting may not be an effective solution. It can help us use network resources more efficiently, but may not add more total network capacity.

Other solutions to increasing cellular data demands have also been discussed. Ubiquitous WiFi is one such approach, but has been shown to have limitations in offering truly ubiquitous coverage, and in fact the trend has been towards more mobile broadband usage. It is understood that the deployment of future, e.g., 5G, networks will improve cellular performance substantially, but the ever-growing increase in mobile data consumption suggests that it will still be beneficial to increase the efficiency of network resource utilization, e.g., according to the time-shifting techniques disclosed herein.

Short-term scheduling as used herein refers to peak utilization that can be reduced for traffic using delays of seconds or hundreds of milliseconds by delaying this traffic as needed to flatten congestion spikes. In some embodiments traffic shaping can be applied to reduce peak congestion, at the cost of some loss in performance. However, these approaches smooth traffic during peak hours, rather than reduce the average load altogether, and do not need to deal with unknown, unshiftable traffic, user movement, or the overhead of coordinating traffic over long time scales.

In some embodiments, prefetching can use short-term prefetching to improve performance on mobile devices while meeting data and power budgets. Time intervals of about 30-60 seconds for delaying traffic are considered short term. Other approaches can include sharing popular downloaded traffic in a peer-to-peer manner. Still other approaches can include prefetching data when it could potentially lead to excessive data usage.

In some embodiments, mobile connectivity or user movement patterns can be determined and used in connection with predicting per-eNB utilization based on predicted movement of the mobile device. For example, the next cell tower a user visits can be predicted given the current one. Other considerations for forecasting can include considering generally global network congestion trends, while observing that individual cell towers may have anomalous behavior. Still other considerations for forecasting can include insight into particular users, locations and/or times of day. For example, heavy data users tend to be clustered in a few hotspots in large cities, causing network congestion.

It is understood that in some situations users can explicitly indicate what content they want to access in the future, such that this information can be used in predicting future user content accesses. It is further understood that Facebook content and ads would benefit from prefetching, and applications such as Flipboard, a magazine app, already supports prefetching.

Upon reviewing the aforementioned embodiments, it would be evident to an artisan with ordinary skill in the art that said embodiments can be modified, reduced, or enhanced without departing from the scope of the claims described below. For example, data transfers in its broadest sense can include uploads of data content items as well. Consider a user who wishes to upload video content from a vacation to a social network application. The user can make a request to upload one or more content items, identifying the content items and optionally providing a deadline by which any upload should be completed. The system when indicating to the user equipment when to download, can provide the response in different ways depending on how the system is realized. For example, the response can be made to an original API request. If a decision cannot be made right away the response can be provided later once it has been scheduled. Such applications can include using a call-back mechanism, e.g. SMS, periodic polling from the device, and so on. The various techniques disclosed herein can be applied to schedule the upload based on one or more of location(s) of the mobile device and congestion of the base stations.

Although fulfillment of the time-shifted download has been disclosed as including a scheduled request from the mobile device to the content provider, it is understood that some transfers can include a "push" from a content provider to the mobile device. In such instances, one of the network or the content provider can receive indication of any scheduled time-shifts so that the network and/or the content provider can push the data to the mobile device at the scheduled time(s).

Many of the examples disclosed herein are directed to specific download requests for specific content items, it is understood that the techniques disclosed herein can be applied in a more general sense. For example, the requests can be associated with subscriptions, in which subscribed content can be scheduled before any specific request is made. Such scheduling might include pre-downloads of subscribed content, or content that is likely to be of interest to a user of the mobile device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
one or more processors; and
a memory that stores executable instructions that, when executed by the one or more processors, facilitate performance of operations, comprising:
identifying an original data transfer request requesting a transfer of data to a mobile device via a mobile network, wherein the original data transfer request occurs during a scheduling interval of a plurality of scheduling intervals, wherein each scheduling interval of the plurality of scheduling intervals has a duration greater than a data transit time of the mobile network;
identifying a quantity of data requested by the original data transfer request;
identifying a scheduling capacity of a candidate base station;
comparing the quantity of data requested to the scheduling capacity;
directing the candidate base station to deliver data to the mobile device during the scheduling interval, responsive to the quantity of data requested being less than the scheduling capacity; and
deferring the original data transfer request to a subsequent scheduling interval of the plurality of scheduling intervals, responsive to the quantity of data requested being greater than the scheduling capacity, wherein the deferring of the original data transfer request to the subsequent scheduling interval of the plurality of scheduling intervals comprises resubmitting the original data transfer request in the subsequent scheduling interval of the plurality of scheduling intervals.

2. The system of claim 1, wherein the original data transfer request comprises a deadline, the quantity of data or both.

3. The system of claim 2, wherein the identifying of the scheduling capacity comprises:
identifying an average utilization of the candidate base station based on prior utilization of the candidate base station;
identifying, for the candidate base station, a quantity of time-sensitive data within the scheduling interval; and
determining a difference between the average utilization and the quantity of time-sensitive data, wherein the difference is indicative of the scheduling capacity.

4. The system of claim 1, wherein the duration of each scheduling interval of the plurality of scheduling intervals is greater than about one minute.

5. The system of claim 1, further comprising:
forecasting a location of the mobile device to obtain a forecasted location; and
selecting the candidate base station based on the forecasted location.

6. The system of claim 1, wherein the original data transfer request is one of a plurality of data transfer requests within the scheduling interval.

7. The system of claim 6, wherein the operations further comprise:
prioritizing the plurality of data transfer requests within the scheduling interval to obtain a plurality of prioritized data transfer requests, wherein each data transfer request of the plurality of data transfer requests comprises a corresponding priority;
determining for a first portion of the plurality of prioritized data transfer requests a second quantity of data requested;
comparing the second quantity of data requested to the scheduling capacity; and
scheduling the first portion of the plurality of prioritized data transfer requests within the scheduling interval, responsive to the second quantity of data requested being less than the scheduling capacity.

8. The system of claim 7, wherein the scheduling of the original data transfer request within the scheduling interval is responsive to the first portion of the plurality of prioritized data transfer requests comprising the original data transfer request.

9. A method, comprising:
identifying, by a system comprising a processor, a download request to download data to a mobile device via a mobile network during a scheduling interval of a plurality of scheduling intervals, wherein each scheduling interval of the plurality of scheduling intervals has a duration greater than a data transfer time across the mobile network;
identifying, by the system, an amount of data requested by the download request;
comparing, by the system, the amount of data requested to a data transfer capacity of a base station;
scheduling, by the system, the download request within the scheduling interval, responsive to the amount of data requested being less than the data transfer capacity; and
deferring, by the system, the download request to another scheduling interval of the plurality of scheduling intervals, responsive to the amount of data requested being greater than the data transfer capacity, wherein the deferring of the download request to the another scheduling interval of the plurality of scheduling intervals comprises resubmitting the download request in the another scheduling interval of the plurality of scheduling intervals.

10. The method of claim 9, wherein the download request comprises a deadline, the amount of data requested or both, and wherein the duration of the scheduling interval is greater than one minute.

11. The method of claim 10, further comprising determining the data transfer capacity, wherein the determining the data transfer capacity comprises:
identifying, by the system, an average utilization of the base station based on prior utilization of the base station;
identifying, by the system, for the base station, an amount of time-sensitive data associated with data transfers occurring within the scheduling interval; and
determining, by the system, a difference between the average utilization and the amount of time-sensitive data, wherein the difference is indicative of the data transfer capacity.

12. The method of claim 9, wherein the download request is one of a plurality of download requests within the scheduling interval, and wherein the system comprises a distributed processing system.

13. The method of claim 12, further comprising:
prioritizing, by the system, the plurality of download requests within the scheduling interval to obtain a plurality of prioritized download requests, wherein each download request of the plurality of download requests comprises a corresponding priority;
determining, by the system, for a first portion of the plurality of prioritized download requests a second amount of data requested;

comparing, by the system, the second amount of data requested to the data transfer capacity; and scheduling, by the system, the first portion of the plurality of prioritized download requests within the scheduling interval, responsive to the second amount of data requested being less than the data transfer capacity.

14. The method of claim 13, wherein the scheduling of the download request within the scheduling interval is responsive to the first portion of the plurality of prioritized download requests comprising the download request.

15. A non-transitory, machine-readable storage medium, comprising executable instructions that, when executed by one or more processors, facilitate performance of operations, comprising:

identifying a data request to transfer data for a mobile device across a mobile network, wherein the data request occurs within a time interval of a plurality of time intervals, wherein each time interval of the plurality of time intervals has a duration greater than a data transit time across the mobile network;

determining a volume of data requested by the data request;

comparing the volume of data requested to a data transfer capacity of a wireless access terminal;

scheduling a transfer of the data within the time interval, responsive to the volume of data requested being less than the data transfer capacity; and deferring the transfer of the data to another time interval of the plurality of time intervals, responsive to the volume of data requested being greater than the data transfer capacity, wherein the deferring of the data to the another time comprises resubmitting the data request in the another time interval of the plurality of time intervals.

16. The non-transitory, machine-readable storage medium of claim 15, wherein the volume of data is identified within the data request.

17. The non-transitory, machine-readable storage medium of claim 16, further comprising:

identifying a volume of data transferred within a time interval of the plurality of time intervals of the wireless access terminal based on prior utilization of the wireless access terminal;

identifying for the wireless access terminal, a volume of time-sensitive data transfers within the time interval; and determining a difference between the volume of data transferred and the volume of time-sensitive data, wherein the difference is indicative of the data transfer capacity of the wireless access terminal.

18. The non-transitory, machine-readable storage medium of claim 15, wherein the data request is one of a plurality of data requests within the time interval.

19. The non-transitory, machine-readable storage medium of claim 18, wherein the operations further comprise:

prioritizing the plurality of data requests within the time interval to obtain a plurality of prioritized data requests, wherein the each data request of the plurality of data requests comprises a corresponding priority;

determining for a first portion of the plurality of prioritized data requests a second volume of data requested;

comparing the second volume of data requested to the data transfer capacity; and scheduling the first portion of the plurality of data requests within the time interval, responsive to the second volume of data requested being less than the data transfer capacity.

20. The non-transitory, machine-readable storage medium of claim 19, wherein the scheduling of the data request within the time interval is responsive to the first portion of the plurality of prioritized data requests comprising the data request.

* * * * *